US011240839B2

(12) United States Patent
Yang et al.

(10) Patent No.: US 11,240,839 B2
(45) Date of Patent: Feb. 1, 2022

(54) FEEDBACK TRANSMISSIONS USING UPLINK SHARED CHANNEL

(71) Applicant: QUALCOMM Incorporated, San Diego, CA (US)

(72) Inventors: Wei Yang, San Diego, CA (US); Seyedkianoush Hosseini, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 37 days.

(21) Appl. No.: 16/800,644

(22) Filed: Feb. 25, 2020

(65) Prior Publication Data

US 2020/0275476 A1 Aug. 27, 2020

Related U.S. Application Data

(60) Provisional application No. 62/810,303, filed on Feb. 25, 2019.

(51) Int. Cl.
*H04W 72/14* (2009.01)
*H04L 5/00* (2006.01)
(Continued)

(52) U.S. Cl.
CPC .......... *H04W 72/14* (2013.01); *H04B 7/0417* (2013.01); *H04B 7/0456* (2013.01);
(Continued)

(58) Field of Classification Search
CPC .. H04B 7/0417; H04B 7/0456; H04B 7/0482; H04B 7/0626; H04B 7/0645;
(Continued)

(56) References Cited

U.S. PATENT DOCUMENTS

2012/0087334 A1* 4/2012 Suzuki ................. H04L 5/0091
370/329
2014/0321406 A1* 10/2014 Marinier .......... H04W 72/0413
370/329
(Continued)

OTHER PUBLICATIONS

CATT: "Multiplexing of UCI and UL Data on PUSCH", 3GPP Draft, 3GPP TSG RAN WG1 Meeting #90bis, R1-1717831,3rd Generation Partnership Project (3GPP), Mobile Competence Centre, 650, Route Des Lucioles, F-06921, Sophia-Antipolis Cedex, France, vol. RAN WG1, No. Prague. CZ; Oct. 9, 2017-Oct. 13, 2017, Oct. 8, 2017 (Oct. 8, 2017), XP051341016, 5 pages, Retrieved from the Internet: URL:http://www.3gpp.org/ftp/Meetings_3GPP_SYNC/RAN1/Docs/ [retrieved on Oct. 8, 2017] the whole document.
(Continued)

*Primary Examiner* — Gary Mui
(74) *Attorney, Agent, or Firm* — Holland & Hart LLP

(57) ABSTRACT

Methods, systems, and devices for wireless communications provide for feedback transmissions using an uplink shared channel. A user equipment (UE) may transmit feedback to a base station using physical uplink shared channel (PUSCH) resources. The base station may transmit an uplink grant to the UE indicating a set of resources for uplink data transmissions. The base station may subsequently transmit a downlink grant for the UE. Based on monitoring resources indicated by the downlink grant, the UE may generate feedback indicating the success of receiving or decoding the PDSCH transmission. The UE may transmit the feedback to the base station on the PUSCH resources. In some cases, the UE may transmit both the feedback for the PDSCH transmission received after the uplink grant and for a second PDSCH transmission received prior to the uplink grant using PUSCH resources.

30 Claims, 20 Drawing Sheets

(51) Int. Cl.

| | | |
|---|---|---|
| *H04B 7/0456* | (2017.01) | |
| *H04W 72/12* | (2009.01) | |
| *H04L 1/18* | (2006.01) | |
| *H04W 8/24* | (2009.01) | |
| *H04L 1/00* | (2006.01) | |
| *H04B 7/06* | (2006.01) | |
| *H04B 7/0417* | (2017.01) | |

(52) U.S. Cl.
CPC ......... *H04B 7/0626* (2013.01); *H04L 1/0068* (2013.01); *H04L 1/1819* (2013.01); *H04L 5/0055* (2013.01); *H04W 8/24* (2013.01); *H04W 72/1268* (2013.01)

(58) Field of Classification Search
CPC ... H04L 1/0013; H04L 1/0031; H04L 1/0068; H04L 1/1819; H04L 5/0044; H04L 5/0053; H04L 5/0055; H04L 5/0094; H04W 8/24; H04W 72/1268; H04W 72/1278; H04W 72/14
See application file for complete search history.

(56) References Cited

U.S. PATENT DOCUMENTS

| | | | | |
|---|---|---|---|---|
| 2016/0254901 | A1* | 9/2016 | You | H04J 1/16 370/281 |
| 2017/0134140 | A1* | 5/2017 | Park | H04L 1/0046 |
| 2017/0310426 | A1* | 10/2017 | Fan | H04L 1/0013 |
| 2018/0242320 | A1* | 8/2018 | Wong | H04L 1/1858 |
| 2019/0069321 | A1* | 2/2019 | Akkarakaran | H04L 5/0091 |
| 2019/0191434 | A1* | 6/2019 | Hugl | H04L 5/0096 |
| 2019/0320431 | A1* | 10/2019 | Huang | H04L 5/0078 |
| 2019/0335488 | A1* | 10/2019 | Xiong | H04L 5/0055 |
| 2020/0196333 | A1* | 6/2020 | Lin | H04L 5/0055 |
| 2020/0213952 | A1* | 7/2020 | Wang | H04W 72/14 |
| 2020/0235865 | A1* | 7/2020 | Takeda | H04L 1/1812 |
| 2020/0235866 | A1* | 7/2020 | Liu | H04L 5/0094 |
| 2020/0252168 | A1* | 8/2020 | Kim | H04L 1/1664 |
| 2020/0403758 | A1* | 12/2020 | Song | H04L 5/0057 |
| 2021/0006375 | A1* | 1/2021 | Takeda | H04W 72/04 |
| 2021/0068115 | A1* | 3/2021 | Gotoh | H04W 72/04 |

OTHER PUBLICATIONS

International Search Report and Written Opinion—PCT/US2020/019758—ISA/EPO—dated May 25, 2020.

NTT Docomo, et al., "HARQ-ACK Feedback", 3GPP Draft, 3GPP TSG RAN WG1 NR Ad-Hoc#3, R1-1716105, 3rd Generation Partnership Project (3GPP), Mobile Competence Centre, 650, Route Des Lucioles ; F-06921 Sophia-Antipolis Cedex ; France, vol. RAN WG1, No. Nagoya, Japan; Sep. 18, 2017-Sep. 21, 2017, Sep. 17, 2017 (Sep. 17, 2017), XP051339563, 11 Pages, Retrieved from the Internet: URL:http://www.3gpp.org/ftp/Meetings_3GPP_SYNC/RAN1/Docs/ [retrieved on Sep. 17, 2017], Section 2.3, the whole document.

NTT Docomo, et al., "UCI Multiplexing," 3GPP Draft, 3GPP TSG RAN WG1 Meeting 90bis, R1-1718213, 3rd Generation Partnership Project (3GPP), Mobile Competence Centre, 650, Route Des Lucioles, F-06921, Sophia-Antipolis Cedex, France, vol. RAN WG1, No. Prague. CZ; Oct. 9, 2017-Oct. 13, 2017, Oct. 8, 2017 (Oct. 8, 2017), XP051341395, 8 pages, Retrieved from the Internet: URL: http://www.3gpp.org/ftp/Meetings_3GPP_SYNC/RAN1/Docs/ [retrieved on Oct. 8, 2017] the whole document.

OPPO: "UCI Enhancement for URLLC," 3GPP Draft, 3GPP TSG RAN WG1 Meeting #95, R1-1812816, 3rd Generation Partnership Project (3GPP), Mobile Competence Centre, 650, Route Des Lucioles, F-06921, Sophia-Antipolis Cedex, France, vol. RAN WG1, No. Spokane, USA; Nov. 12, 2018-Nov. 16, 2018, Nov. 11, 2018 (Nov. 11, 2018), XP051554776, 6 pages, Retrieved from the Internet: URL: http://www.3gpp.org/ftp/Meetings%5F3GPP%5FSYNC/RAN1/Docs/R1%2D1812816%2Ezip [retrieved on Nov. 11, 2018], the whole document.

Qualcomm Incorporated: "Summary of Maintenance for DL/UL Scheduling", 3GPP Draft, 3GPP TSG-RAN WG1 Meeting #93, R1-1807825_SUMMARY_7.1.3.3.2_SCHED_HARQ_V10, 3rd Generation Partnership Project (3GPP), Mobile Competence Centre, 650, Route Des Lucioles, F-06921, Sophia-Antipolis Cedex, France, vol. RAN WG1, No. Busan, Korea; May 21, 2018-May 25, 2018, May 24, 2018 (May 24, 2018), XP051463430, 33 pages, Retrieved from the Internet: URL:http://www.3gpp.org/ftp/tsg%5Fran/WG1%5FRL1/TSGR1%5F93/Docs [retrieved on May 24, 2018], p. 6, 3.5 DL SPS Release and Group TPCpp. 14-16,7 Scheduling causality, pp. 17-21,9 URLLC related aspectsp. 23. Observation 1. Proposal 3, Proposal 4. Proposal 5.

* cited by examiner

FEEDBACK TRANSMISSIONS USING UPLINK SHARED CHANNEL

CROSS REFERENCE

The present Application for Patent claims the benefit of U.S. Provisional Patent Application No. 62/810,303 by YANG et al., entitled "FEEDBACK TRANSMISSIONS USING UPLINK SHARED CHANNEL," filed Feb. 25, 2019, assigned to the assignee hereof, and expressly incorporated herein.

BACKGROUND

The following relates generally to wireless communications, and more specifically to feedback transmissions using uplink shared channel.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support feedback transmissions using uplink shared channel. In some cases, a user equipment (UE) may transmit feedback to a base station using resources scheduled for an uplink shared channel (e.g., a physical uplink shared channel (PUSCH)). The base station may transmit an uplink grant to the UE indicating a set of resources for uplink data transmissions or other shared channel transmissions. After transmitting the uplink grant, the base station may subsequently transmit a downlink grant that indicates resources scheduled for a physical downlink shared channel (PDSCH) transmission for the UE. The UE may generate feedback for the PDSCH transmission and transmit the feedback to the base station via the PUSCH resources.

In some cases, the UE may transmit the feedback for more than one PDSCH transmission to the UE. That is, the base station may transmit a second downlink grant for a second PDSCH transmission to the UE prior to transmitting the uplink grant for the PUSCH. Here, the UE may transmit a first feedback associated with the first PDSCH transmission (e.g., the PDSCH transmission scheduled via a downlink grant after receiving the uplink grant) and a second feedback associated with the second PDSCH transmission (e.g., the PDSCH transmission scheduled via a downlink grant prior to receiving the uplink grant) on the PUSCH resources. In some examples, the UE may generate a first codebook associated with the first feedback and a second codebook associated with the second feedback separate from the first codebook. Here, the UE may map or encode bits of the first and second feedback based on their corresponding codebooks (e.g., a UE may map or encode certain bits to certain resources of the PUSCH according to a mapping or encoding scheme identified by the codebook). The UE may map the second feedback to the PUSCH resources according to feedback mapping information within a downlink grant (e.g., for the second PDSCH transmission). In some cases, the UE may map the first feedback to the PUSCH resources by puncturing the PUSCH data resources. Alternatively, the UE may map the first feedback to the PUSCH resources and rate match the PUSCH data. Additionally or alternatively, the codebook for the first feedback may include resources for the second feedback. Here, the UE may include the second feedback within the same resources indicated by the codebook for the first feedback.

A method of wireless communications at a UE is described. The method may include receiving an uplink grant that indicates scheduling information for an uplink shared channel transmission for the UE; receiving a downlink grant after receiving the uplink grant, the downlink grant indicating scheduling information for a downlink shared channel transmission for the UE or a release of periodically scheduled resources for the UE; optionally monitoring for the downlink shared channel transmission based on the scheduling information for the downlink shared channel transmission; generating feedback information based on the downlink grant; and performing the uplink shared channel transmission including the feedback information for the downlink shared channel transmission based on the scheduling information for the uplink shared channel transmission.

An apparatus for wireless communications at a UE is described. The apparatus may include a processor, memory in electronic communication with the processor, and instructions stored in the memory. The instructions may be executable by the processor to cause the apparatus to receive an uplink grant that indicates scheduling information for an uplink shared channel transmission for the UE; receive a downlink grant after receiving the uplink grant, the downlink grant indicating scheduling information for a downlink shared channel transmission for the UE or a release of periodically scheduled resources for the UE; optionally monitor for the downlink shared channel transmission based on the scheduling information for the downlink shared channel transmission; generate feedback information based on the downlink grant; and perform the uplink shared channel transmission including the feedback information for the downlink shared channel transmission based on the scheduling information for the uplink shared channel transmission.

Another apparatus for wireless communications at a UE is described. The apparatus may include means for receiving an uplink grant that indicates scheduling information for an uplink shared channel transmission for the UE; receiving a downlink grant after receiving the uplink grant, the downlink grant indicating scheduling information for a downlink shared channel transmission for the UE or a release of periodically scheduled resources for the UE; optionally monitoring for the downlink shared channel transmission based on the scheduling information for the downlink shared channel transmission; generating feedback information based on the downlink grant; and performing the uplink shared channel transmission including the feedback information for the downlink shared channel transmission based on the scheduling information for the uplink shared channel transmission.

A non-transitory computer-readable medium storing code for wireless communications at a UE is described. The code may include instructions executable by a processor to receive an uplink grant that indicates scheduling information for an uplink shared channel transmission for the UE; receive a downlink grant after receiving the uplink grant, the downlink grant indicating scheduling information for a downlink shared channel transmission for the UE or a release of periodically scheduled resources for the UE; optionally monitor for the downlink shared channel transmission based on the scheduling information for the downlink shared channel transmission; generate feedback information based on the downlink grant; and perform the uplink shared channel transmission including the feedback information for the downlink shared channel transmission based on the scheduling information for the uplink shared channel transmission.

Some examples of the method, apparatuses, and non-transitory computer-readable medium described herein may further include operations, features, means, or instructions for receiving a second downlink grant before receiving the uplink grant, the second downlink grant indicating scheduling information for a second downlink shared channel transmission for the UE; monitoring for the second downlink shared channel transmission based on the scheduling information for the second downlink shared channel transmission; generating feedback information for the second downlink shared channel transmission based on the monitoring; and performing the uplink shared channel transmission including the feedback information for the second downlink shared channel transmission.

In some examples of the method, apparatuses, and non-transitory computer-readable medium described herein, the feedback information for the downlink shared channel includes hybrid automatic repeat request (HARQ) acknowledgement (HARQ-ACK) feedback corresponding to the downlink shared channel, and the feedback information for the second downlink shared channel includes HARQ-ACK feedback corresponding to the second downlink shared channel.

Some examples of the method, apparatuses, and non-transitory computer-readable medium described herein may further include operations, features, means, or instructions for generating a first codebook associated with the feedback information for the downlink shared channel transmission, and generating a second codebook associated with the feedback information for the second downlink shared channel transmission, the second codebook separate from the first codebook.

In some examples of the method, apparatuses, and non-transitory computer-readable medium described herein, performing the uplink shared channel transmission may include operations, features, means, or instructions for mapping a set of feedback bits of the first codebook and the second codebook to a set of resources identified by the scheduling information for the uplink shared channel transmission, and mapping information bits of the uplink shared channel transmission around the set of resources.

In some examples of the method, apparatuses, and non-transitory computer-readable medium described herein, mapping the set of feedback bits may include operations, features, means, or instructions for mapping the set of feedback bits of the first codebook to a first subset of resources, and mapping the set of feedback bits of the second codebook to a second subset of resources, where the second subset and the first subset may be non-overlapping.

Some examples of the method, apparatuses, and non-transitory computer-readable medium described herein may further include operations, features, means, or instructions for mapping the set of feedback bits of the first codebook to at least one symbol following a set of symbols associated with a demodulation reference signal (DMRS), the set of feedback bits of the second codebook, and channel state information (CSI) feedback.

Some examples of the method, apparatuses, and non-transitory computer-readable medium described herein may further include operations, features, means, or instructions for mapping the set of feedback bits of the first codebook to at least one symbol following a set of symbols associated with a corresponding uplink control channel.

Some examples of the method, apparatuses, and non-transitory computer-readable medium described herein may further include operations, features, means, or instructions for mapping a set of feedback bits of the second codebook to a set of resources identified by the scheduling information for the uplink shared channel transmission, mapping information bits of the uplink shared channel transmission around the set of resources, puncturing a subset of the mapped information bits, and mapping a set of feedback bits of the first codebook to resources corresponding to the punctured subset of the mapped information bits.

Some examples of the method, apparatuses, and non-transitory computer-readable medium described herein may further include operations, features, means, or instructions for puncturing a subset of the mapped set of feedback bits of the second codebook, and mapping a second set of feedback bits of the first codebook to the punctured subset of the mapped set of feedback bits of the second codebook.

Some examples of the method, apparatuses, and non-transitory computer-readable medium described herein may further include operations, features, means, or instructions for identifying a semi-static codebook configuration associated with a semi-static HARQ-ACK feedback codebook for downlink shared channels, and generating the uplink shared channel transmission based on the semi-static codebook configuration, where generating includes including the feedback information for the downlink shared channel transmission in corresponding locations of the semi-static HARQ-ACK codebook.

Some examples of the method, apparatuses, and non-transitory computer-readable medium described herein may further include operations, features, means, or instructions for generating a CSI report, and performing the uplink shared channel transmission including the CSI report.

Some examples of the method, apparatuses, and non-transitory computer-readable medium described herein may further include operations, features, means, or instructions for mapping the CSI report to a set of resources identified by the scheduling information for the uplink shared channel transmission, rate matching information bits of the uplink shared channel transmission around the set of resources, puncturing a subset of the rate matched information bits, and mapping a set of feedback bits of a first codebook associated with the downlink shared channel to resources corresponding to the punctured subset of the rate matched information bits.

Some examples of the method, apparatuses, and non-transitory computer-readable medium described herein may further include operations, features, means, or instructions for puncturing a subset of the CSI report, and mapping a second set of feedback bits of the first codebook resources corresponding to the punctured subset of the CSI report.

Some examples of the method, apparatuses, and non-transitory computer-readable medium described herein may further include operations, features, means, or instructions for mapping information bits of the uplink shared channel transmission to a set of resources identified by the scheduling information for the uplink shared channel transmission, puncturing a subset of the mapped information bits, and mapping a set of feedback bits corresponding to the feedback information for the downlink shared channel transmission to at least a portion of resources corresponding to the punctured subset of the mapped information bits.

Some examples of the method, apparatuses, and non-transitory computer-readable medium described herein may further include operations, features, means, or instructions for identifying a transmission power control command for adjusting a transmission power of the uplink shared channel transmission, and performing the uplink shared channel transmission based on the transmission power control command.

In some examples of the method, apparatuses, and non-transitory computer-readable medium described herein, identifying the transmission power control command may include operations, features, means, or instructions for receiving an indication of the transmission power control command in the downlink grant, the transmission power control command indicating an adjustment of the transmission power of the uplink shared channel transmission with respect to a previous transmission power control command.

In some examples of the method, apparatuses, and non-transitory computer-readable medium described herein, the previous transmission power control command may be indicated by the uplink grant.

Some examples of the method, apparatuses, and non-transitory computer-readable medium described herein may further include operations, features, means, or instructions for including the feedback information for the downlink shared channel transmission in the uplink shared channel transmission based on at least one of a codebook size, a codebook type, an uplink shared channel transmission duration, a modulation coding scheme, a timeline, a UE capability, or any combination thereof.

In some examples of the method, apparatuses, and non-transitory computer-readable medium described herein, the timeline may be associated with a processing time for preparing the feedback information for the downlink shared channel transmission or a threshold number of symbols.

Some examples of the method, apparatuses, and non-transitory computer-readable medium described herein may further include operations, features, means, or instructions for transmitting a report of the UE capability to a base station, the UE capability including an indication of the feedback information for the downlink shared channel transmission or a processing time associated with the UE.

Some examples of the method, apparatuses, and non-transitory computer-readable medium described herein may further include operations, features, means, or instructions for identifying a set of resources for the feedback information for the downlink shared channel transmission based on a modulation and coding scheme of the uplink shared channel transmission.

A method of wireless communications at a base station is described. The method may include transmitting an uplink grant that indicates scheduling information for an uplink shared channel transmission for a UE; transmitting a downlink grant after transmitting the uplink grant, the downlink grant indicating scheduling information for a downlink shared channel transmission for the UE or a release of periodically scheduled resources for the UE; and monitoring for the uplink shared channel transmission from the UE based on the scheduling information for the uplink shared channel transmission, the uplink shared channel transmission including feedback information for the downlink shared channel transmission.

An apparatus for wireless communications at a base station is described. The apparatus may include a processor, memory in electronic communication with the processor, and instructions stored in the memory. The instructions may be executable by the processor to cause the apparatus to transmit an uplink grant that indicates scheduling information for an uplink shared channel transmission for a UE; transmit a downlink grant after transmitting the uplink grant, the downlink grant indicating scheduling information for a downlink shared channel transmission for the UE or a release of periodically scheduled resources for the UE; and monitor for the uplink shared channel transmission from the UE based on the scheduling information for the uplink shared channel transmission, the uplink shared channel transmission including feedback information for the downlink shared channel transmission.

Another apparatus for wireless communications at a base station is described. The apparatus may include means for transmitting an uplink grant that indicates scheduling information for an uplink shared channel transmission for a UE; transmitting a downlink grant after transmitting the uplink grant, the downlink grant indicating scheduling information for a downlink shared channel transmission for the UE or a release of periodically scheduled resources for the UE; and monitoring for the uplink shared channel transmission from the UE based on the scheduling information for the uplink shared channel transmission, the uplink shared channel transmission including feedback information for the downlink shared channel transmission.

A non-transitory computer-readable medium storing code for wireless communications at a base station is described. The code may include instructions executable by a processor to transmit an uplink grant that indicates scheduling information for an uplink shared channel transmission for a UE; transmit a downlink grant after transmitting the uplink grant, the downlink grant indicating scheduling information for a downlink shared channel transmission for the UE or a release of periodically scheduled resources for the UE; and monitor for the uplink shared channel transmission from the UE based on the scheduling information for the uplink shared channel transmission, the uplink shared channel transmission including feedback information for the downlink shared channel transmission.

Some examples of the method, apparatuses, and non-transitory computer-readable medium described herein may further include operations, features, means, or instructions for transmitting a second downlink grant before transmitting the uplink grant, the second downlink grant indicating scheduling information for a second downlink shared channel transmission for the UE; transmitting the second downlink shared channel transmission based on the scheduling information for the second downlink shared channel transmission; and receiving the uplink shared channel transmission from the UE based on the scheduling information for the uplink shared channel transmission, the uplink shared channel transmission including feedback information for the second downlink shared channel transmission.

In some examples of the method, apparatuses, and non-transitory computer-readable medium described herein, the feedback information for the downlink shared channel includes HARQ-ACK feedback corresponding to the downlink shared channel, and the feedback information for the second downlink shared channel includes HARQ-ACK feedback corresponding to the second downlink shared channel.

Some examples of the method, apparatuses, and non-transitory computer-readable medium described herein may further include operations, features, means, or instructions for determining feedback information for at least one of the first and second downlink shared channel transmissions, where the uplink shared channel transmission includes a first codebook associated with feedback information for the downlink shared channel transmission and a second codebook associated with feedback information for the second downlink shared channel transmission separate from the first codebook.

In some examples of the method, apparatuses, and non-transitory computer-readable medium described herein, the uplink shared channel transmission includes a set of feedback bits of the first codebook and the second codebook mapped to a set of resources identified by the scheduling information for the uplink shared channel transmission and a set of information bits mapped around the set of resources.

In some examples of the method, apparatuses, and non-transitory computer-readable medium described herein, a subset of feedback bits of the first codebook may be mapped to a first subset of resources non-overlapping with a second subset of resources associated with a mapped subset of feedback bits of the second codebook.

In some examples of the method, apparatuses, and non-transitory computer-readable medium described herein, the set of feedback bits of the first codebook may be mapped at least one symbol following a set of symbols associated with a DMRS, the set of feedback bits of the second codebook, and CSI feedback.

In some examples of the method, apparatuses, and non-transitory computer-readable medium described herein, the set of feedback bits of the first codebook may be mapped to at least one symbol following a set of symbols associated with a corresponding uplink control channel.

Some examples of the method, apparatuses, and non-transitory computer-readable medium described herein may further include operations, features, means, or instructions for determining a set of feedback bits of the first codebook based on receiving the uplink shared channel transmission, where the set of feedback bits puncture a mapped set of information bits associated with the uplink shared channel transmission.

In some examples of the method, apparatuses, and non-transitory computer-readable medium described herein, the set of feedback bits puncture a mapped set of feedback bits of the second codebook.

Some examples of the method, apparatuses, and non-transitory computer-readable medium described herein may further include operations, features, means, or instructions for receiving the uplink shared channel transmission from the UE based on the scheduling information for the uplink shared channel transmission, the uplink shared channel transmission including a CSI report.

In some examples of the method, apparatuses, and non-transitory computer-readable medium described herein, a set of feedback bits of a first codebook associated with the downlink shared channel may be mapped to a punctured subset of information bits of the uplink shared channel rate matched around a set of resources corresponding to the CSI report.

In some examples of the method, apparatuses, and non-transitory computer-readable medium described herein, the CSI report may be mapped to a set of resources identified by the scheduling information for the uplink shared channel transmission.

Some examples of the method, apparatuses, and non-transitory computer-readable medium described herein may further include operations, features, means, or instructions for transmitting an indication of a semi-static HARQ-ACK feedback codebook configuration associated with a semi-static codebook for downlink shared channels, and receiving the uplink shared channel transmission based on the semi-static codebook configuration, where feedback information for the downlink shared channel transmission may be assigned to corresponding locations of the semi-static codebook based on the semi-static HARQ-ACK codebook configuration.

In some examples of the method, apparatuses, and non-transitory computer-readable medium described herein, the indication of the semi-static codebook configuration may be transmitted via control signaling.

Some examples of the method, apparatuses, and non-transitory computer-readable medium described herein may further include operations, features, means, or instructions for transmitting an indication of a transmission power control command in the downlink grant, the transmission power control command indicating an adjustment of a transmission power of the uplink shared channel transmission with respect to a previous transmission power control command.

Some examples of the method, apparatuses, and non-transitory computer-readable medium described herein may further include operations, features, means, or instructions for including the previous transmission power control command in the uplink grant.

Some examples of the method, apparatuses, and non-transitory computer-readable medium described herein may further include operations, features, means, or instructions for receiving a report of a UE capability from the UE, the UE capability including an indication of feedback information for the downlink shared channel transmission or a processing time associated with the UE.

DETAILED DESCRIPTION

Figure 1:
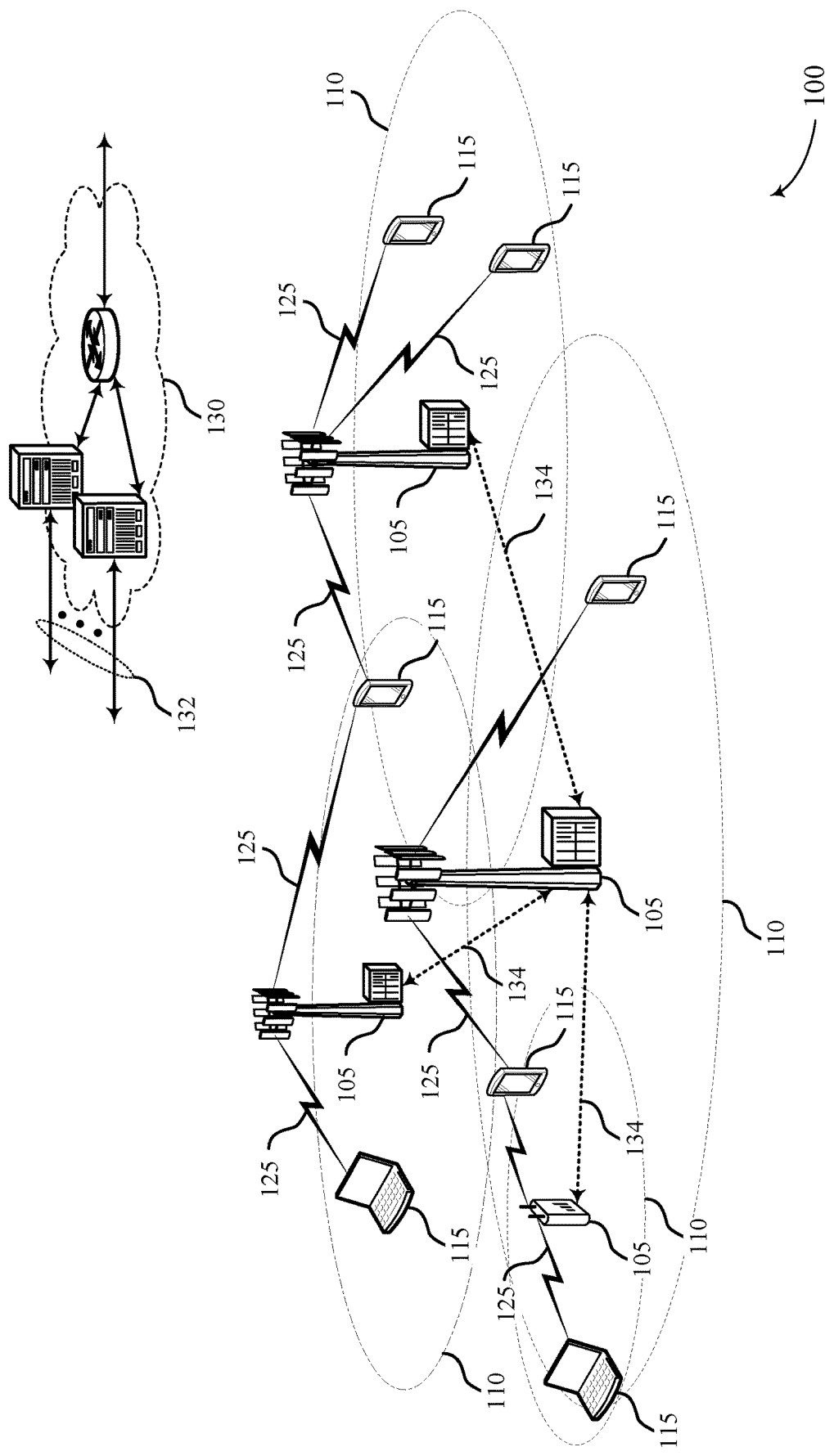
FIG. 1 illustrates an example of a wireless communications system that supports feedback transmissions using uplink shared channel in accordance with aspects of the present disclosure.

Wireless communications systems may implement control messages (e.g., physical downlink control channel (PDCCH) messages transmitted by a base station) to grant or schedule resources for subsequent data transmissions (e.g., where the data transmissions are sent over a physical downlink shared channel (PDSCH)). If a user equipment (UE) receives and successfully decodes a PDCCH message from a base station, the UE may then monitor the resources indicated by the PDCCH to receive and decode a downlink data transmission scheduled by the PDCCH message. The UE may, in some cases, generate feedback for the base station to indicate whether receipt of the downlink data transmission was successful and transmit this feedback to the base station. In low latency operations (e.g., in ultra-reliable low latency communications (URLLC)), latency introduced when transmitting the feedback to the base station may not meet latency targets, resulting in inefficient or in some cases, lost communications.

Various aspects of the present disclosure provide for feedback transmissions using an uplink shared channel. For example, a UE may transmit feedback to a base station indicating the success of receiving or decoding a PDSCH transmission. The UE may transmit the feedback via physical uplink shared channel (PUSCH) resources indicated by an uplink grant received from the base station. In some systems, the UE may not transmit feedback for a PDSCH transmission to the base station on PUSCH resources indicated by an uplink grant received by the UE prior to receiving the PDSCH transmission. For example, the UE may transmit feedback for a PDSCH transmission on PUSCH resources indicated to the UE by an uplink grant received after the PDSCH transmission. However, if the UE receives the PDSCH transmission after receiving the uplink grant and prior to the PUSCH resources indicated by the uplink grant, latency may be decreased by transmitting the feedback for the PDSCH transmission on the PUSCH resources (e.g., when compared to transmitting the feedback for the PDSCH transmission on resources as indicated by a later uplink grant, or as periodically scheduled). To decrease latency, the UE may transmit the feedback to the base station on the PUSCH resources, which may be indicated by an uplink grant received prior to the PDSCH transmission.

In some cases, the UE may transmit the feedback for multiple PDSCH transmissions. For instance, the base station may transmit a second PDSCH transmission to the UE prior to transmitting the uplink grant for the set of uplink data transmissions. Here, the UE may transmit the first feedback associated with the first PDSCH transmission (e.g., the PDSCH transmission received after receiving the uplink grant) and the second feedback associated with the second PDSCH transmission (e.g., the PDSCH transmission received by the UE prior to receiving the uplink grant) on the PUSCH resources. In some cases, the UE may generate a first codebook associated with the first feedback and a second separate codebook associated with the second feedback. Here, the UE may map the first and second feedback to the PUSCH resources based on their corresponding codebooks. In some cases, the UE may map the second feedback to the PUSCH resources according to feedback mapping information within a downlink grant (e.g., for the second PDSCH transmission). The UE may map the first feedback to the PUSCH resources by puncturing the PUSCH data resources. Alternatively, the UE may map the first feedback to the PUSCH resources and rate match the PUSCH data. Additionally or alternatively, the codebook for the first feedback may additionally include resources for the second feedback. Here, the UE may include the second feedback within the same resources indicated by the codebook for the first feedback.

The UE may map the first or second feedback to resources within the PUSCH following resources allocated to a demodulation reference signal (DMRS). If the UE is transmitting the second feedback (e.g., corresponding to a PDSCH transmission received prior to receiving an uplink grant) during the PUSCH resources, the UE may map the second feedback to the first non-DMRS signal within the PUSCH resources. For transmitting the first feedback (e.g., corresponding to a PDSCH transmission received after receiving the uplink grant), the UE may also map the first feedback to the PUSCH. In a first example, the UE may map the first feedback to the first PUSCH symbols that are not DMRS symbols, second feedback symbols, or symbols being used for other control information (e.g., channel state information (CSI), uplink control information (UCI)). In a second example, the UE may map the first feedback to a first non-DMRS symbol that is on or after a corresponding uplink control channel (e.g., a physical uplink control channel (PUCCH)).

Aspects of the disclosure are initially described in the context of wireless communications systems. Various examples of timelines and process flows are then discussed. Aspects of the disclosure are further illustrated by and described with reference to apparatus diagrams, system diagrams, and flowcharts that relate to feedback transmissions using an uplink shared channel.

FIG. 1 illustrates an example of a wireless communications system 100 that supports feedback transmissions using uplink shared channel in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may transmit feedback to a base station 105 indicating whether a PDSCH transmission was successfully received and decoded by the UE 115. For example, a UE 115 may transmit feedback via PUSCH resources indicated by an uplink grant received from the base station 105. Alternatively, the UE 115 may not transmit feedback for a PDSCH transmission to the base station 105 on PUSCH resources indicated by an uplink grant received by the UE prior to receiving the PDSCH transmission, and may instead transmit feedback for a PDSCH transmission on PUSCH resources indicated to the UE 115 by an uplink grant received after the PDSCH transmission or via periodically scheduled resources. If the UE 115 receives the PDSCH transmission after receiving the uplink grant and prior to the PUSCH resources indicated by the uplink grant, latency may be decreased by transmitting the feedback for the PDSCH transmission on the PUSCH resources (e.g., when compared to transmitting the feedback for the PDSCH transmission on PUSCH resources indicated by a later uplink grant or periodically scheduled resources). In order to decrease latency, the UE 115 may transmit the feedback to the base station 105 on the PUSCH resources that are indicated by an uplink grant received prior to the PDSCH transmission.

In some cases, the UE 115 may transmit the feedback for multiple PDSCH transmissions to the UE 115. That is, the base station 105 may transmit a second PDSCH transmission to the UE 115 prior to transmitting the uplink grant for the PUSCH. Here, the UE 115 may transmit the first feedback associated with the first PDSCH transmission (e.g., the PDSCH transmission received after receiving the uplink grant) and the second feedback associated with the second PDSCH transmission (e.g., the PDSCH transmission received by the UE 115 prior to receiving the uplink grant) on the PUSCH resources.

Figure 2:
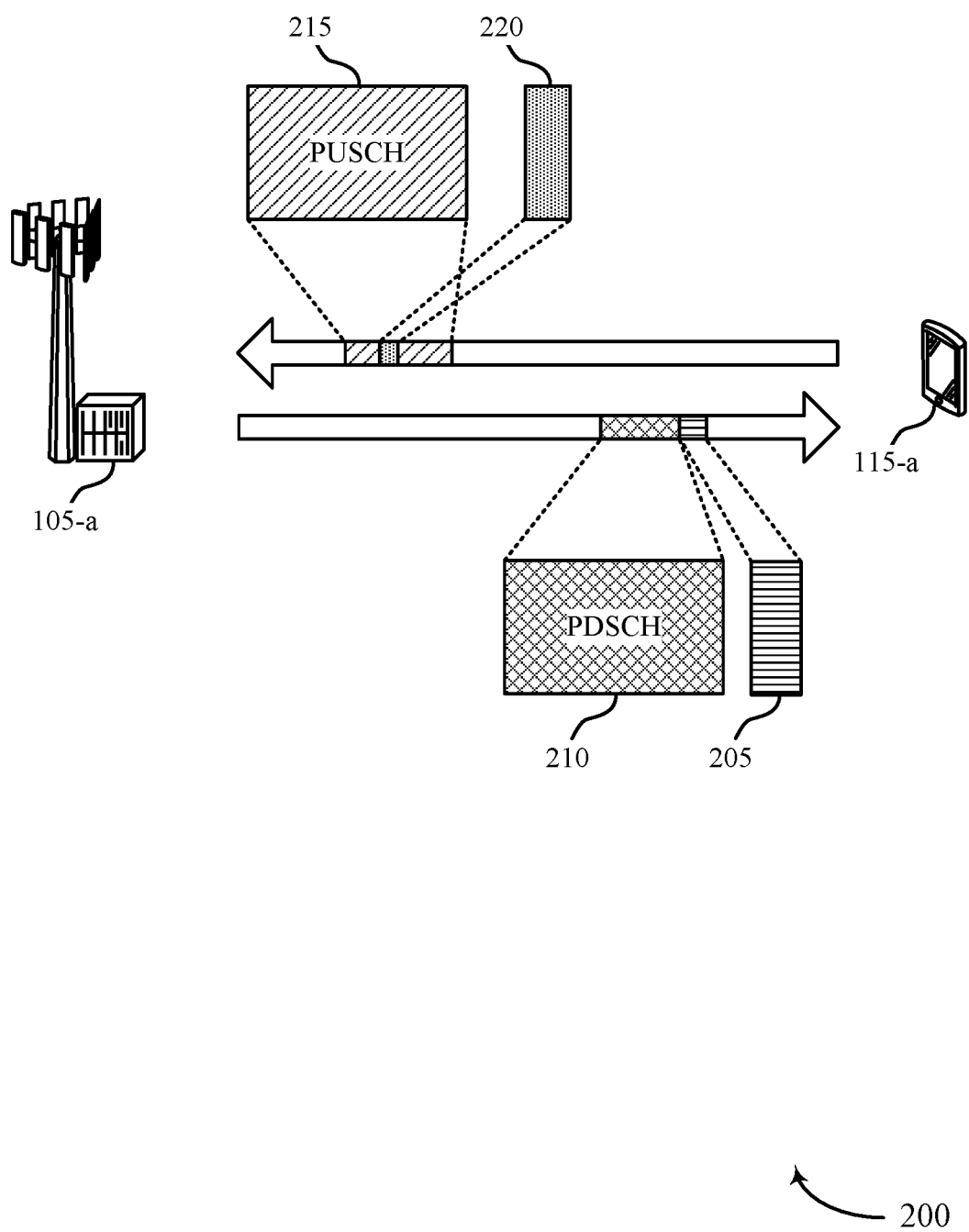
FIG. 2 illustrates an example of a wireless communications system that supports feedback transmissions using uplink shared channel in accordance with aspects of the present disclosure.

FIG. 2 illustrates an example of a wireless communications system 200 that supports feedback transmissions using uplink shared channel in accordance with aspects of the present disclosure. In some examples, wireless communications system 200 may implement aspects of wireless communications system 100. The wireless communications system 200 may include base station 105-*a* and UE 115-*a*, which may be examples of the corresponding devices described with reference to FIG. 1. The base station 105-*a* may transmit downlink communications to UE 115-*a* including a downlink grant 205 and a PDSCH transmission 210 scheduled by the downlink grant 205. Additionally, or alternatively, the downlink grant 205 may indicate a release of resources scheduled for the UE 115-*a* such as a release of semi-persistently scheduled (SPS) resources configured for or otherwise allocated for use by the UE 115-*a*. That is, the downlink grant 205 may be used to indicate to the UE 115-*a* that such resources are no longer available or configured for use by the UE 115-*a* or that SPS communications are to cease (at least temporarily) at the UE 115-*a* over the SPS resources indicated by the downlink grant 205. Further, the UE 115-*a* may transmit uplink communications to base station 105-*a* including PUSCH transmission 215 and feedback information 220, which may include feedback generated by the UE 115-*a*. In some cases, feedback information 220 may indicate whether the PDSCH 210 was successfully received. In other cases, feedback information 220 may indicate whether downlink grant 205 indicating a release of resources scheduled for UE 115-*a* was successfully received.

The base station 105-*a* may transmit the downlink grant 205 to the UE 115-*a* via a PDCCH, and the downlink grant 205 may indicate resources for the UE 115-*a* scheduled for an upcoming PDSCH transmission 210. In some cases, the downlink grant 205 may schedule a feedback information transmission for the UE 115-*a* to provide feedback associated with the PDSCH transmission 210 or feedback for the release of SPS resources.

The base station 105-*a* may transmit the PDSCH transmission 210 (e.g., indicated by the downlink grant 205) and, using information indicated by the downlink grant 205, the UE 115-*a* may monitor a set of resources scheduled for the PDSCH transmission 210. The UE 115-*a* may generate feedback information 220 indicating whether the UE 115-*a* successfully receives and decodes the PDSCH transmission 210 or whether the UE 115-*a* has successfully received the release information in the downlink grant 205 (e.g., a release indicating that scheduled SPS resources are to be release by the UE 115-*a*). The feedback information 220 may be an example of HARQ feedback. For example, the UE 115-*a* may generate a HARQ-acknowledgment (ACK) feedback to the base station 105-*a* to indicate successful receipt of the PDSCH transmission 210 or, alternatively, the UE 115-*a* may generate a HARQ-negative ACK (HARQ-NACK) to indicate an unsuccessful receipt of the PDSCH transmission 210.

In some examples, the UE 115-*a* may transmit the feedback information 220 via PUSCH transmission 215 resources (e.g., piggyback the feedback information 220 on the PUSCH transmission 215 resources). The UE 115-*a* may optionally transmit other information on the resources associated with the PUSCH transmission 215 (e.g., UCI or CSI). In some cases, the PUSCH transmission 215 may be scheduled by an uplink grant transmitted from the base station 105-*a* to the UE 115-*a*. The uplink grant associated with the PUSCH transmission 215 may be transmitted before or after the downlink grant 205. If the uplink grant is transmitted after the downlink grant 205, the UE 115-*a* may determine resources within the PUSCH transmission 215 for transmitting the feedback information 220. Here, the UE 115-*a* may map the feedback information 220 to the resources within the PUSCH transmission 215. If the uplink grant is transmitted prior to the downlink grant 205, UE 115-*a* may puncture the PUSCH transmission 215 or transmit the feedback information 220 on resources occupied by other information within the PUSCH transmission 215 (e.g., UCI or CSI). Here, the feedback information 220 may be referred to as a late feedback information 220 because the downlink grant 205 scheduling the PDSCH transmission 210 for which feedback is generated was transmitted after (i.e., later than) the uplink grant. In some cases where the UE 115-*a* punctures the PUSCH transmission 215, the UE 115-*a* may map the PUSCH transmission 215 and puncture the mapped PUSCH transmission 215 resources with the feedback information 220. When the UE 115-*a* punctures the PUSCH transmission 215, the UE 115-*a* replaces PUSCH data (or other control information being transmitted within the PUSCH transmission 215) with the feedback information 220. In some other cases where the UE 115-*a* transmits the feedback information 220 on resources for other feedback information transmissions, the resources of the other feedback information transmissions may include additional resources for the feedback information 220.

The UE 115-*a* may indicate to the base station 105-*a* whether the UE 115-*a* supports transmitting the feedback information 220 in cases when the uplink grant associated with PUSCH transmission 215 is received before the downlink grant 205. That is, not all UEs 115 may support transmitting the feedback information 220 on the PUSCH transmission 215 resources when the uplink grant associated with the PUSCH transmission 215 is received before the downlink grant 205.

By transmitting the feedback information 220 within the PUSCH transmission 215 resources in cases when the uplink grant associated with PUSCH transmission 215 is received both before and after the downlink grant 205, the wireless communications system 200 may decrease latency associated with communications between the UE 115-a and base station 105-a (e.g., when compared to a wireless communicates system where the UE 115-a only transmits the feedback information 220 within the PUSCH transmission 215 resources if the uplink grant associated with PUSCH transmission 215 is received after the downlink grant 205).

Figure 3:
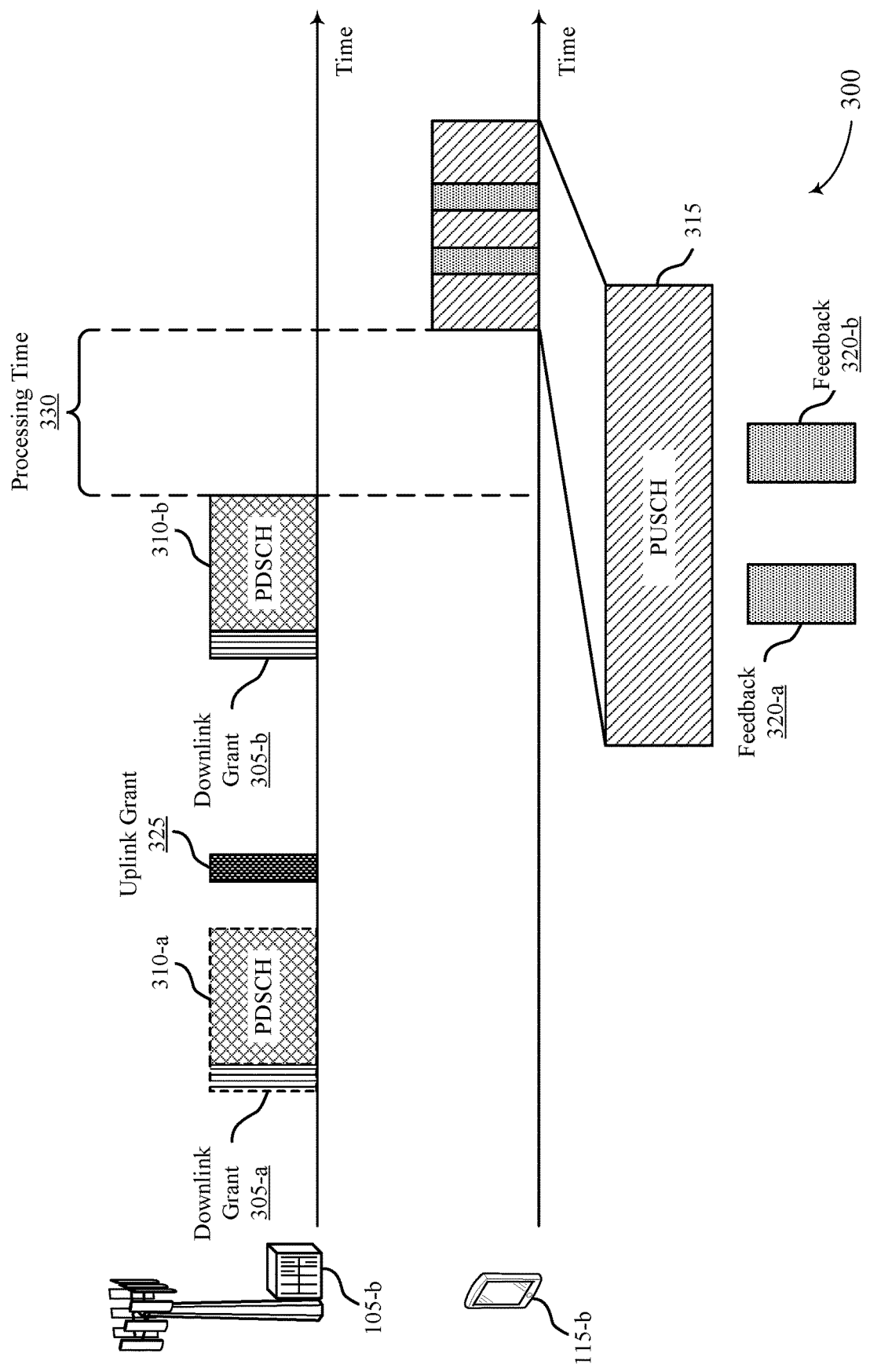
FIG. 3 illustrates an example of a timeline that supports feedback transmissions using uplink shared channel in accordance with aspects of the present disclosure.

FIG. 3 illustrates an example of a timeline 300 that supports feedback transmissions using uplink shared channel in accordance with aspects of the present disclosure. In some examples, timeline 300 may implement aspects of wireless communications systems 100 or 200. The timeline 300 illustrates example transmissions from a base station 105-b and UE 115-b, which may be examples of the corresponding devices described with reference to FIGS. 1 and 2. The transmissions may include downlink transmissions from the base station 105-b to the UE 115-b and uplink transmissions from the UE 115-b to the base station 105-b. The downlink grants 305, the PDSCH transmissions 310, the PUSCH transmission 315, and the feedback information 320 may be examples of the corresponding communications as described with reference to FIG. 2.

The base station 105-b may transmit downlink grants 305-a and 305-b and corresponding PDSCH transmissions 310-a and 310-b to the UE 115-b. In some cases, the base station 105-b may only transmit one of the downlink grants 305 and corresponding PDSCH transmissions 310 (e.g., downlink grant 305-b and PDSCH transmission 310-b). The base station 105-b may transmit the PDSCH transmissions 310 (e.g., indicated by the corresponding downlink grants 305). The UE 115-b may monitor the resources associated with the PDSCH transmissions 310 according to the corresponding downlink grants 305. The UE 115-b may generate feedback information 320-a indicating whether the UE 115-b successfully receives and decodes the PDSCH transmission 310-a and feedback information 320-b indicating whether the UE 115-b successfully receives and decodes the PDSCH transmission 310-b. In the case that the base station 105-b only transmitted downlink grant 305-b and PDSCH transmission 310-b, the UE 115-b may not transmit feedback information 320-a. The UE 115-b may transmit (e.g., piggyback) the feedback information 320 in a PUSCH transmission 315 indicated by the uplink grant 325.

The UE 115-b may generate feedback information 320 based on a codebook associated with the feedback information 320. The codebook for the feedback information 320 may be specific to each feedback information 320. For example, feedback information 320-a may be associated with a different codebook than feedback information 320-b. The UE 115-b may determine a size of the codebook for the feedback information 320-a which may enable the base station 105-b to decode the PUSCH transmissions 315 and the feedback information 320-a. If the UE 115-b incorrectly determines the size of the codebook for the feedback information 320-a, there may be misalignment of the size of the feedback information 320-a and the base station 105-b may not correctly receive or decode the feedback information 320-a within the resources of the PUSCH transmission 315.

In some cases, the codebooks for a feedback information 320-a may be semi-statically determined. That is, the size of the codebook for a feedback information 320-a may not be based on the downlink grants 305 or the uplink grant 325 and may instead be defined for the UE 115-b (e.g., by a specification) or be determined by the UE 115-b based on information indicated within RRC signaling. In some instances of semi-static codebook size determination, the UE 115-b may only send a single bit (e.g., if only one bit is used for the feedback information 320-a) instead of the entire semi-static codebook.

In some other cases, the codebook for a feedback information 320-a may be dynamically determined. For dynamically determining the codebook, the size of the codebook for the feedback information 320-a may be determined based on the downlink grants 305-a or the uplink grant 325. For example, the uplink grant 325 may indicate codebook information for feedback transmitted within the resources associated with the PUSCH transmission 315. The codebook information may be for feedback associated with a PDSCH transmission 310 transmitted prior to the uplink grant 325. For example, the codebook information may be for feedback information 320-a associated with the PDSCH 310-a transmitted prior to the uplink grant 325. The codebook information may include codebook size information that is indicated by a downlink assignment index (DAI) filed within the uplink grant 325. The UE 115-b may generate a codebook associated with the feedback information 320-a based on the codebook size information indicated within the uplink grant 325. That is, in a case of dynamic codebook determination, the UE 115-b may determine the size of feedback information 320-a based on the uplink grant 325. This may enable the UE 115-b to transmit the feedback information 320-a according to a correct codebook even if the UE 115-b does not correctly receive or decode the downlink grant 305-a.

In some cases, the UE 115-b may separately form a codebook for the feedback information 320-b associated with the PDSCH transmission 310-b. Further, the UE 115-b may encode the feedback information 320-a and 320-b separately. Here, the UE 115-b may map the feedback information 320-a (e.g., corresponding to a set of feedback bits associated with the PDSCH transmission 310-a) to resources within the PUSCH 315 (e.g., according to the downlink grant 305-a). The UE 115-b may then map the PUSCH data around the feedback 320-a and subsequently puncture the PUSCH transmission 315 with the feedback 320-b. That is, the UE 115-b may not rate match the PUSCH data within the PUSCH transmission 315 (e.g., around the feedback information 320-b) and in some cases, the UE 115-b may not puncture the feedback information 320-a or the DMRS associated with PUSCH transmission 315. In some cases, the UE 115-b may puncture CSI being transmitted on the resources of the PUSCH transmission 315 with the feedback transmission 320-b. However, the UE 115-b may puncture a specific type of CSI transmissions (e.g., the UE 115-b may puncture CSI part 2 transmissions but not CSI part 1 transmissions).

The CSI transmission may correspond to a CSI report generated by the UE 115-b. The UE 115-b may generate a CSI report which indicates the quality of the downlink channel from the base station 105-b to the UE 115-b. The UE 115-b may include the CSI report within the PUSCH transmission 315. In some cases, the UE 115-b may include the CSI report within the PUSCH transmission 315 and may rate-match the CSI report around the feedback information 320-a also included in the PUSCH transmission 315.

By puncturing the PUSCH transmission 315 with the feedback 320-b, the UE 115-b may decrease the performance of the PUSCH transmission 315 (e.g., decrease a total amount of power or resources associated with the PUSCH transmission 315), since the base station 105-b may not provide resources for the feedback 320-b at a time when it schedules the PUSCH transmission 315. Therefore, the UE 115-b may adjust the power for the PUSCH transmission 315 (e.g., increase the power) to compensate for the performance degradation of the PUSCH transmission 315 due to the puncturing. The UE 115-b may adjust the power based on a transmission power control command received in the downlink grant 305-b. The transmission power control command may indicate an adjustment of the transmission power of the PUSCH transmission 315 with respect to a previous transmission power control command (e.g., a transmission power control indicated by the previous transmission power control command). The base station 105-b may transmit the previous power control command to the UE 115-b within an uplink grant (e.g., uplink grant 325).

In some other cases (e.g., as opposed to puncturing the PUSCH transmission 315), the UE 115-b may insert the feedback information 320-b into the codebook for the feedback information 320-a. That is, the codebook for the feedback information 320-a may additionally include resources for the feedback information 320-b. In this case, the codebook for the feedback information 320-a (e.g., determined semi-statically) may include a whole codebook on the PUSCH transmission 315. Here, the UE 115-b may insert the feedback information 320-b into the codebook.

The UE 115-b may transmit the feedback 320 within the PUSCH transmission 315 according to one or more guidelines. The guidelines may ensure that the UE 115-b transmits a certain amount of PUSCH data within the PUSCH transmission 315 (e.g., as opposed to only feedback or control data). The guidelines may be defined by a specification or, alternatively, configured dynamically (e.g., by uplink grants or downlink grants from the base station 105-b to the UE 115-b) or semi-statically (e.g., by RRC signaling from the base station 105-b to the UE 115-b).

In a first example of the guidelines, the UE 115-b may transmit feedback 320-b (e.g., feedback corresponding to a PDSCH transmission 310-b transmitted after the uplink grant 325) that is less than a certain number of bits (e.g., only one or two bits large). That is, the UE 115-b may include the feedback 320-b on the PUSCH transmission 315 if the number of information bits in the feedback 320-b is either one or two, and UE 115-b may not include the feedback 320-b on the PUSCH transmission 315 if the number of information bits in the feedback 320-b is more than two. In a second example, the UE 115-b may transmit feedback 320-b based on the type of codebook associated with the feedback 320-b (e.g., a dynamic codebook and not a semi-static codebook). That is, the UE 115-b may include the feedback 320-b on the PUSCH transmission 315 if the codebook type is dynamic codebook, and UE 115-b may not include the feedback 320-b on the PUSCH transmission 315 if the codebook type is semi-static codebook. Alternatively, the UE 115-b may include the feedback 320-b on the PUSCH transmission 315 if the codebook type is semi-static codebook, and UE 115-b may not include the feedback 320-b on the PUSCH transmission 315 if the codebook type is dynamic codebook. In a third example, the UE 115-b may transmit feedback 320-b based on a duration of the PUSCH 315 (e.g., the UE 115-b may not transmit the feedback 320-b if the PUCH transmission duration 315 is less than a threshold duration). In a fourth example, the UE 115-b may limit the transmission of feedback 320-b based on an MCS range (e.g., the UE 115-b may not transmit the feedback 320-b if the MCS corresponding to the PUSCH transmission 315 is above a certain value).

The UE 115-b may determine whether to transmit the feedback 320-b (e.g., feedback corresponding to a PDSCH transmission 310 transmitted after the uplink grant 325) based on a number of resources within the PUSCH transmission 315 that may be allocated for non-PUSCH data transmission. For example, a minimum ratio of data to control resources (e.g., a beta-factor $\alpha$) may be set. Here, if the number of resources being used for transmitting the feedback 320-a and the feedback 320-b causes the ratio of data to control resources to fall below the minimum, the UE 115-b may not transmit the feedback 320-b within the PUSCH transmission 315. In some cases, the UE 115-b may not transmit all of the feedback 320-b. In some other cases, the UE 115-b may transmit a portion of the feedback 320-b and drop another portion of the feedback 320-b (e.g., to cause the ratio of data to control resources to stay above the minimum). The minimum ratio of data to control resources may be indicated by the base station 105-b by RRC signaling or DCI signaling. In another example, the total number of resources (e.g., resource elements) for UCI within the PUSCH transmission 315 may be limited. The UE 115-b may not transmit the feedback 320-b within the PUSCH transmission 315 if the feedback 320-b may not be transmitted within the unused resources allocated for UCI (e.g., resources allocated for UCI but not being used for UCI). The total number of resources for UCI may be indicated by the base station 105-b by RRC signaling.

The UE 115-b may determine whether to transmit the feedback 320-b within the PUSCH transmission 315 (e.g., as opposed to a later PUSCH transmission 315) based on a timing consideration. For example, the UE 115-b may not transmit the feedback 320-b within the PUSCH transmission 315 if the processing time 330 is less than a threshold amount of time (e.g., less than a threshold number of symbols). The processing time 330 may correspond to an amount of time between the UE 115-b receiving the PDSCH transmission 310-b and the beginning of the PUSCH transmission 315 or a corresponding PUCCH transmission. The base station 105-b may indicate the starting location of the corresponding PUCCH in the downlink grant 305-b. The UE 115-b may use a processing time 330 corresponding to the beginning of the PUSCH transmission 315 if the feedback 320-b may be transmitted at the beginning of the PUSCH transmission 315. Alternatively, the UE 115-b may use a processing time 330 corresponding to the beginning of a PUCCH transmission if the feedback 320-b may only be transmitted after the beginning of the PUCCH transmission. In some cases, downlink grant 305-b may indicate a release of resources scheduled for UE 115-b (e.g., a release of semi-persistently scheduled (SPS) resources). In such cases, the processing time 330 may correspond to an amount of time between the UE 115-b receiving the downlink grant 305-b and the beginning of the PUSCH transmission 315 or a corresponding PUCCH transmission.

Figure 4:
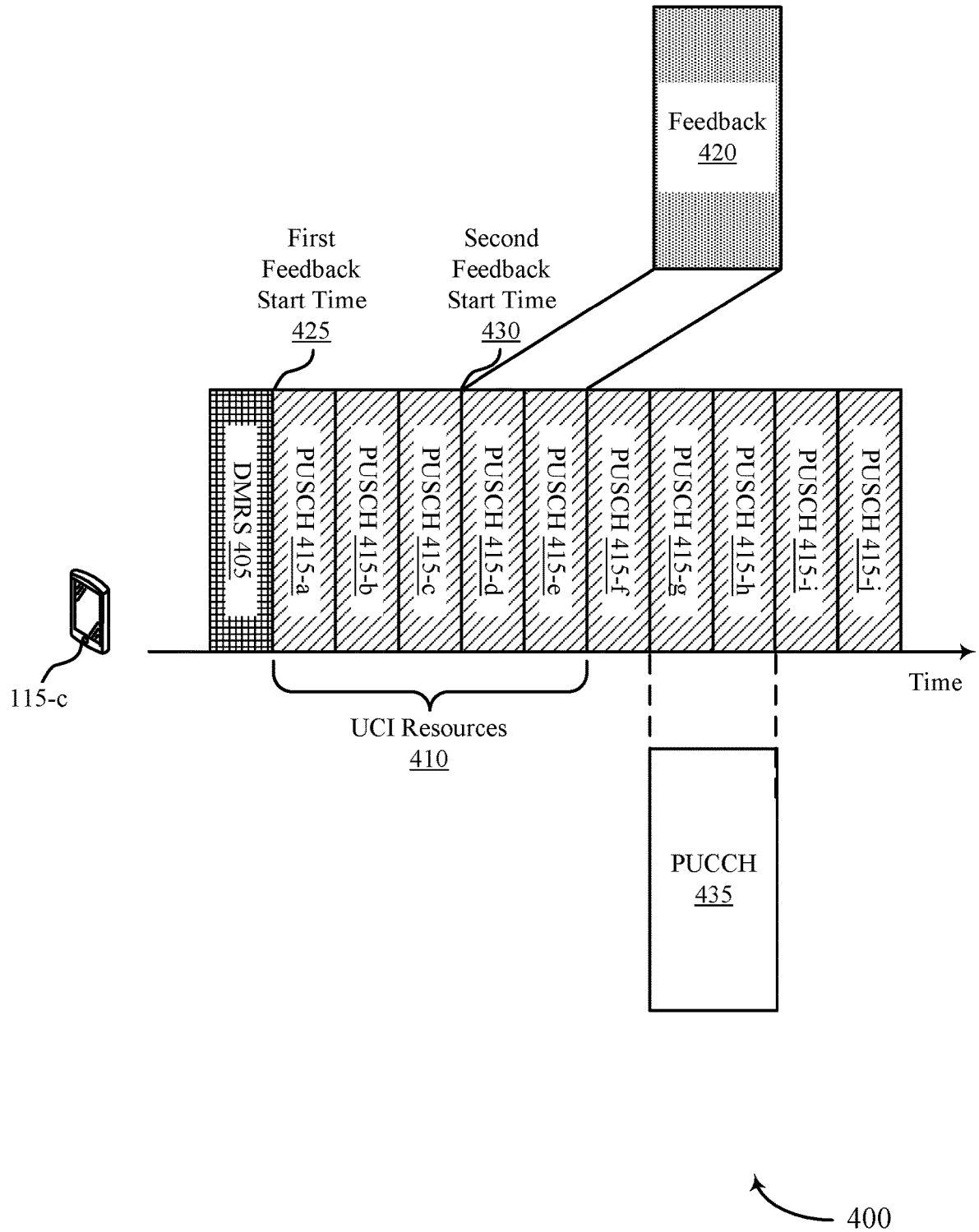
FIG. 4 illustrates an example of a timeline that supports feedback transmissions using uplink shared channel in accordance with aspects of the present disclosure.

FIG. 4 illustrates an example of a timeline 400 that supports feedback transmissions using uplink shared channel in accordance with aspects of the present disclosure. In some examples, timeline 400 may implement aspects of wireless communications systems 100 or 200. The timeline 400 may show transmissions from a UE 115-c, which may be examples of the UEs 115 described with reference to FIGS. 1 through 3. The transmissions may include uplink transmissions from the UE 115-c to a base station, which may be an example of the base stations 105 described with reference to FIGS. 1 through 3. The PUSCH symbols 415 and the feedback information 420 may include aspects of the corresponding transmissions as described with reference to FIGS. 2 and 3.

The UE 115-c may transmit the DMRS 405 prior to transmitting PUSCH symbols 415. The PUSCH symbols 415 may correspond to resources for a PUSCH transmission (e.g., as discussed with reference to FIGS. 2 and 3). The UE 115-c may further transmit the feedback information 420 on one or more of the PUSCH symbols 415. The feedback information 420 may correspond to feedback for a PDSCH transmission (e.g., transmitted from a base station to the UE 115-c). In some cases, the PDSCH transmission (and a corresponding downlink grant for the PDSCH transmission) may be transmitted to the UE 115-c after an uplink grant indicating the PUSCH transmission including the PUSCH symbols 415.

In some cases, the UE 115-c may be transmitting two sets of feedback information 420 on the PUSCH symbols 415. That is, the UE 115-c may have received two downlink grants scheduling two PDSCH transmissions (e.g., one downlink grant prior to receiving the uplink grant for the PUSCH transmission and one downlink grant after receiving the uplink grant for the PUSCH transmission) and may be transmitting feedback information 420 within the PUSCH transmission including PUSCH symbols 415. The optional first feedback information (e.g., corresponding to the PDSCH transmission whose grant is received prior to the uplink grant for the PUSCH transmission) may be mapped to the first non-DMRS PUSCH symbol 415 (e.g., PUSCH symbol 415-a). That is, the optional first feedback information may be transmitted beginning at the first feedback start time 425. In a first example, if the first feedback information includes three symbols, the UE 115-c may transmit the first feedback information on PUSCH symbols 415-a, 415-b, and 415-c. In a second example, the UE 115-c may transmit the entire first feedback information on PUSCH symbol 415-a. The downlink grant received after the uplink grant for the PUSCH transmission may indicate that feedback corresponding to the second PDSCH transmission be transmitted on resources associated with the PUCCH transmission 435. In some cases, the UE 115-c may determine to transmit the feedback 420 on the PUSCH symbols 415 based on the PUCCH transmission 435 and PUSCH transmission being transmitted on overlapping time intervals.

The UE 115-c may map the second feedback information 420 to one or more other PUSCH symbols 415. That is, the UE 115-c may not map the second feedback information 420 to the PUSCH symbols 415 being used to transmit the first feedback information. In a first case, the UE 115-c may map the second feedback information 420 to the first non-DMRS PUSCH symbol 415 that does not contain feedback (e.g., the first feedback information) and certain control information (e.g., UCI such as CSI part 1). For example, if the first feedback information is transmitted on PUSCH symbols 415-a, 415-b, and 415-c, the second feedback start time 430 would occur at the beginning of PUSCH symbol 415-d (e.g., the first non-DMRS PUSCH 415 symbol not containing a feedback information). In another example, if the first feedback information is transmitted within the first two non-DMRS PUSCH 415 symbols (e.g., PUSCH symbol 415-a and PUSCH symbol 415-b) and the PUSCH symbol 415-c is carrying UCI, the UE 115-c may start transmitting the feedback 420 according to the second feedback start time 430 (e.g., PUSCH symbol 415-d).

In a second case, the UE 115-c may map the second feedback information 420 starting from the first non-DMRS PUSCH symbol 415 on or after the starting symbol of the corresponding PUCCH transmission 435 indicated in the downlink grant that schedules the second feedback information 420. That is, the second feedback start time 430 in the PUSCH transmission may occur at the same time as or after a start time of a corresponding PUCCH transmission 435. Here, the starting symbol of the PUCCH transmission 435 may correspond to PUSCH symbol 415-g.

The UE 115-c may map the feedback 420 to the PUSCH symbols 415 according to guidelines (e.g., as discussed with reference to FIG. 3). Further, the UE 115-c may not transmit the feedback 420 within the PUSCH symbols 415 if the feedback 420 does not fit into the unused resources within the UCI resources 410. The UCI resources 410 may correspond to a maximum number of resource elements within the PUSCH transmission that may be used for UCI. The number of resource elements indicated by the UCI resources 410 may be determined based on an indicated percentage of the total resource elements within the PUSCH transmission (e.g., indicated by RRC signaling from a base station). In some cases, the UCI resources 410 may correspond to a maximum number of feedback resources.

Figure 5:
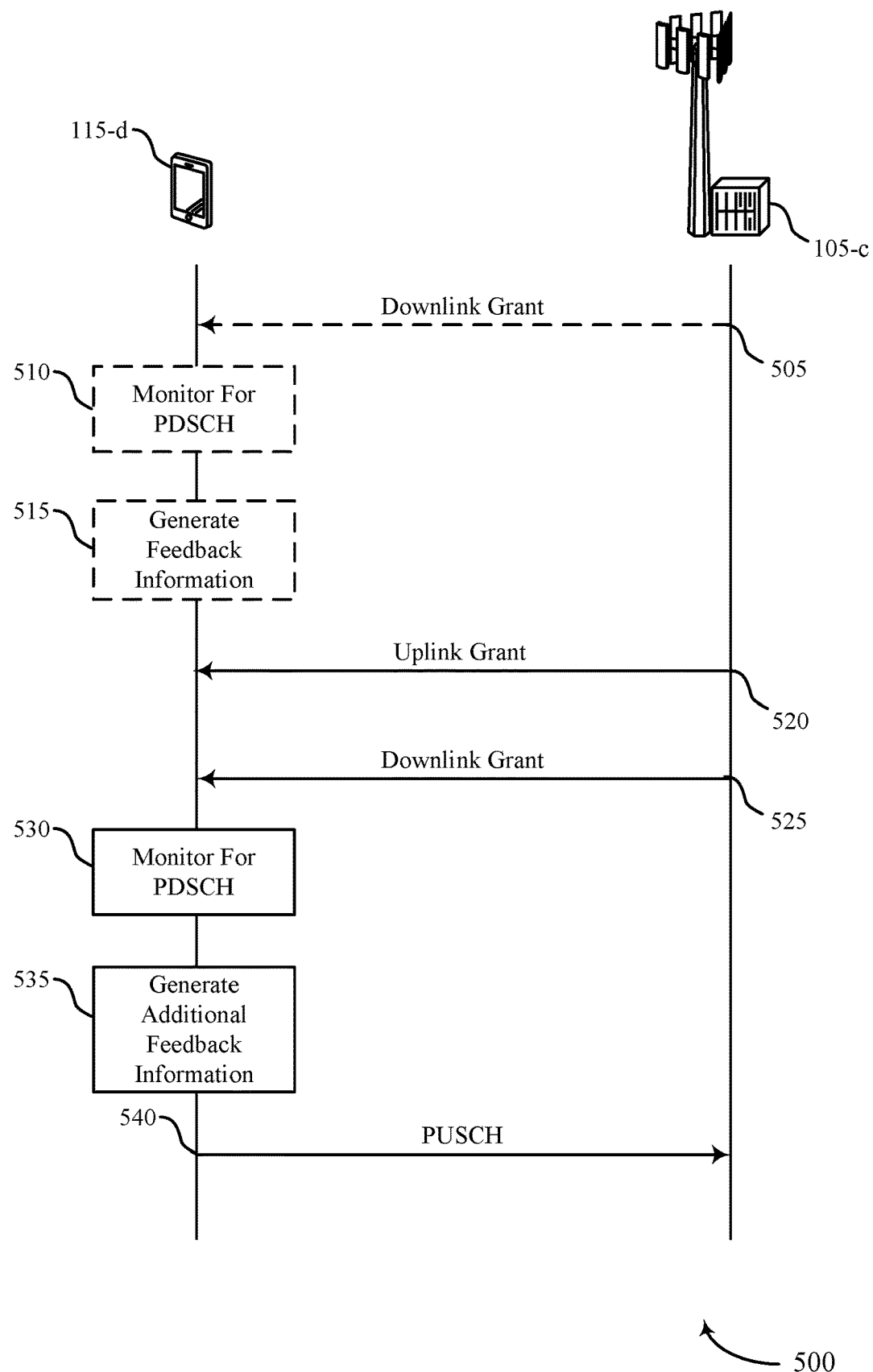
FIG. 5 illustrates an example of a process flow that supports feedback transmissions using uplink shared channel in accordance with aspects of the present disclosure.

FIG. 5 illustrates an example of a process flow 500 that supports feedback transmissions using uplink shared channel in accordance with aspects of the present disclosure. In some examples, process flow 500 may implement aspects of wireless communications systems 100 or 200, or timelines 300 or 400. For example, process flow 500 may include a base station 105-c and a UE 115-d, which may be examples of the corresponding devices described with reference to FIGS. 1 through 4.

At 505, the base station 105-c may optionally transmit one or more downlink grants to UE 115-d. The downlink grants may indicate scheduling information for one or more PDSCH transmissions (e.g., a downlink shared channel transmission) for the UE 115-d.

At 510, the UE 115-d may optionally monitor for a PDSCH transmission based on the scheduling information for the PDSCH (e.g., received within the downlink grant at 505). The UE 115-d may generate a CSI report. The CSI report may indicate the quality of a downlink channel (e.g., the PDSCH).

At 515, the UE 115-d may optionally generate feedback information for the one or more PDSCH transmissions (e.g., indicated by the downlink grant at 505) based on the monitoring at 510. If the UE 115-d generates feedback information at 515, the UE 115-d may further generate a codebook associated with the feedback information for the PDSCH transmission. The feedback information for the PDSCH transmission may include a HARQ-ACK corresponding to the PDSCH (e.g., the downlink shared channel).

At 520, the UE 115-d may receive, from the base station 105-c, an uplink grant that indicates scheduling information for a PUSCH transmission (e.g., an uplink shared channel transmission) for the UE 115-d.

At 525, the UE 115-d may receive a subsequent downlink grant after receiving the uplink grant. The subsequent downlink grant may indicate scheduling information for a subsequent PDSCH transmission for the UE 115-d.

At 530, the UE 115-d may monitor for the subsequent PDSCH transmission based on the scheduling information for the subsequent PDSCH (e.g., indicated by the downlink grant at 525).

At 535, the UE 115-d may generate an additional (e.g., a second) feedback information for the subsequent PDSCH transmission based on the monitoring at 530. The feedback information for the subsequent PDSCH (e.g., the downlink shared channel) may include HARQ-ACK feedback corresponding to the subsequent PDSCH. The UE 115-d may further generate a codebook associated with the feedback information for the subsequent PDSCH transmission, which may be separate from the codebook associated with the feedback information for the earlier PDSCH transmission (e.g., a second codebook associated with the feedback information for the PDSCH transmission indicated by the downlink grant at 505). In some cases, the UE 115-d may identify a semi-static codebook configuration associated with a semi-static HARQ-ACK feedback codebook for PDSCH (e.g., downlink shared channels).

At 540, the UE 115-d may perform a PUSCH transmission (e.g., an uplink shared channel transmission) for the base station 105-c. The PUSCH transmission may include the second feedback information for the subsequent PDSCH transmission (e.g., monitored by the UE 115-d at 530) based on the scheduling information for the PUSCH (e.g., indicated by the subsequent downlink grant at 525). The PUSCH transmission may also include the feedback information for earlier PDSCH transmission. The UE 115-d may include the feedback information for the subsequent PDSCH in the PUSCH based on at least one of a codebook size, a codebook type, a PUSCH transmission duration, an MCS, a timeline, a capability of UE 115-d, or any combination thereof. The timeline may be associated with a processing time for preparing the feedback information for the subsequent PDSCH transmission or a threshold number of symbols. The UE 115-d may transmit a report of the capability of the UE 115-d to the base station 105-c including an indication of the feedback information for the PDSCH or a processing time associated with the UE 115-d. The UE 115-d may identify a set of resources for the feedback information for the subsequent PDSCH transmission based on an MCS of the PUSCH transmission.

The UE 115-d may generate the PUSCH transmission based on the semi-static codebook configuration, where generating the PUSCH transmission includes including the feedback information for the PDSCH in corresponding locations of the semi-static HARQ-ACK codebook. In some examples, the UE 115-d may identify a transmission power control command for adjusting a transmission power of the PUSCH transmission and perform the PUSCH transmission based on the transmission power control command. The UE 115-d may identify the transmission power control command by receiving an indication of the transmission power control command in the downlink grant (e.g., received at 525). The transmission power control command may indicate an adjustment of the transmission power of the PUSCH transmission with respect to a previous transmission power control command. The previous transmission power control command may be indicated by the uplink grant.

In some cases, the UE 115-d may map a set of feedback bits of the first codebook (e.g., associated with feedback for the subsequent PDSCH) and the second codebook (e.g., associated with feedback for the PDSCH monitored at 510) to a set of resources identified by the scheduling information for the PUSCH transmission. The UE 115-d may map information bits of the PUSCH transmission around the set of resources (e.g., subsequent to mapping the feedback of the first codebook and the second codebook to the set of resources). The UE 115-d may map the set of feedback bits by mapping the set of feedback bits of the first codebook to a first subset of resources and mapping the set of feedback bits of the second codebook to a second subset of resources. The first and second subsets of resources may be non-overlapping.

The UE 115-d may map the set of feedback bits to at least one symbol based on the type of symbols within the PUSCH. In a first example, the UE 115-d may map the set of feedback bits of the first codebook to at least one symbol following a set of symbols associated with a DMRS, a set of feedback bits of the second codebook, and CSI feedback. That is, in some cases the UE 115-d may include the CSI report on the PUSCH transmission. In a second example, the UE 115-d may map the set of feedback bits of the first codebook to at least one symbol following a set of symbols associated with a corresponding PUCCH (e.g., an uplink control channel).

In some other cases, the UE 115-d may map the CSI report to a set of resources identified by the scheduling information for the PUSCH transmission. The UE 115-d may map information bits of the PUSCH around the set of resources (e.g., subsequently to mapping the set of feedback bits to the set of resources). In some cases, the UE 115-d may map the information bits of the PUSCH by rate matching the information bits. The UE 115-d may puncture a subset of the mapped information and map a set of feedback bits of the first codebook to resources corresponding to the punctured subset of the mapped information bits. In some instances, the UE 115-d may puncture a subset of the CSI report and map a second set of feedback bits of the first codebook to resources corresponding to the punctured subset of the CSI report.

In some other cases, the UE 115-d may map information bits of the PUSCH transmission to a set of resources identified by the scheduling information for the PUSCH transmission. The UE 115-d may puncture a subset of the mapped information bits and map a set of feedback bits corresponding to the feedback information for the subsequent PDSCH transmission to at least a portion of resources corresponding to the punctured subset of the mapped information bits.

Figure 6:
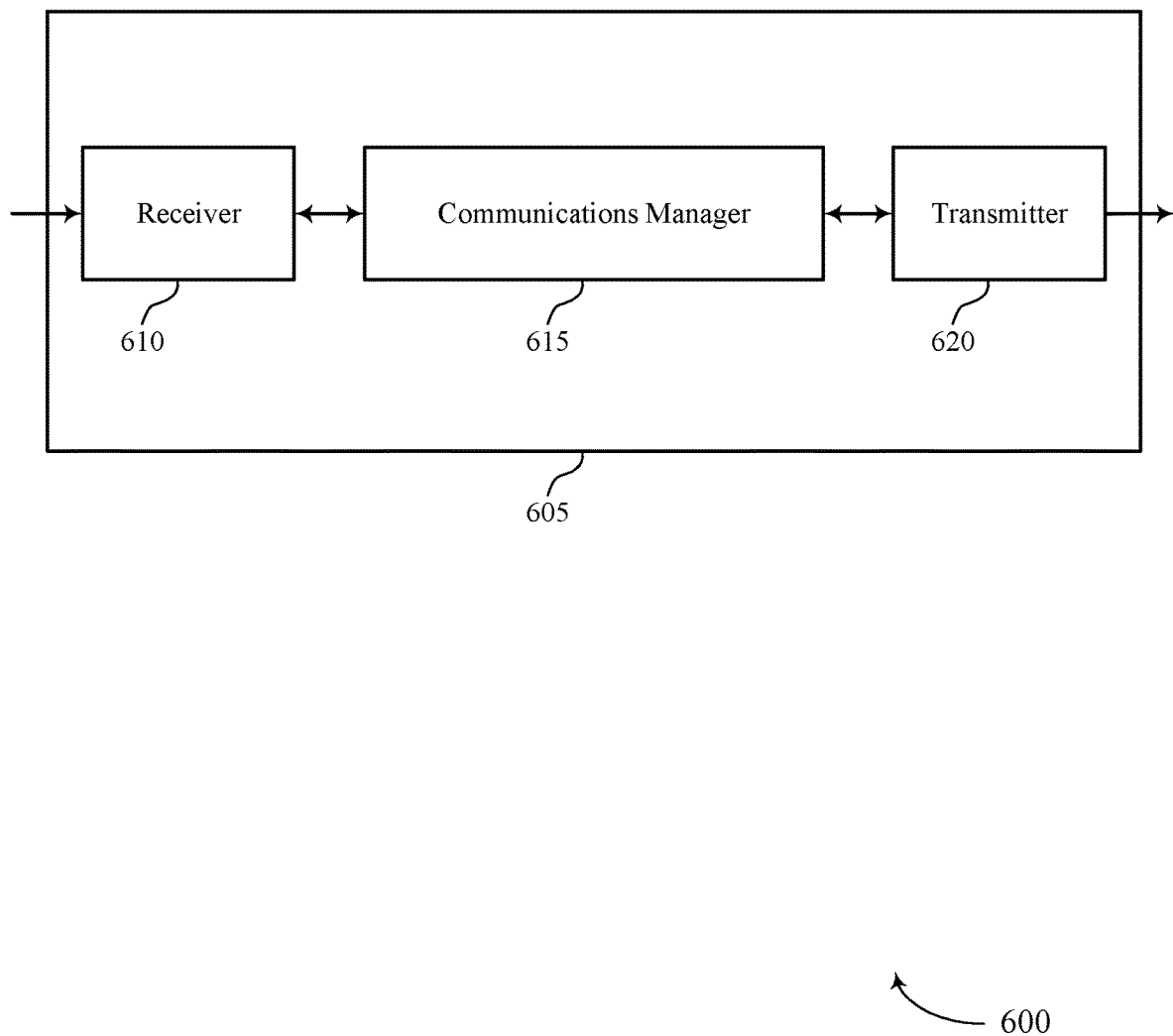
FIGS. 6 and 7 show block diagrams of devices that support feedback transmissions using uplink shared channel in accordance with aspects of the present disclosure.

FIG. 6 shows a block diagram 600 of a device 605 that supports feedback transmissions using uplink shared channel in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to feedback transmissions using uplink shared channel, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive an uplink grant that indicates scheduling information for an uplink shared channel transmission for the UE, and receive a downlink grant after receiving the uplink grant, the downlink grant indicating scheduling information for a downlink shared channel transmission for the UE or a release of periodically scheduled resources for the UE. The communications manager 615 may monitor for the downlink shared channel transmission based on the scheduling information for the downlink shared channel transmission, generate feedback information based on the downlink grant, and perform the uplink shared channel transmission including the feedback information for the downlink shared channel transmission based on the scheduling information for the uplink shared channel transmission. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

In some examples, communications manager 615 may be implemented as an integrated circuit or chipset for a mobile device modem, and the receiver 610 and transmitter 620 may be implemented as analog components (for example, amplifiers, filters, antennas, etc.) coupled with the mobile device modem to enable wireless transmission and reception.

The communications manager 615 as described herein may be implemented to realize one or more potential advantages. Various implementations may reduce latency associated with transmitting PDSCH feedback information. At least some implementations may enable the communications manager 615 to generate feedback information for downlink shared channel transmissions and transmit the feedback information on PUSCH resources in cases where a downlink grant is received after an uplink grant. At least some implementations may enable communications manager 615 to determine an appropriate size of feedback information based on the uplink grant.

Based on implementing the latency reduction techniques as described herein, one or more processors of the device 605 (for example, processor(s) controlling or incorporated with one or more of receiver 610, communications manager 615, and transmitter 620) may improve communications efficiency. For example, a UE may more reliably transmit feedback to a base station when a downlink grant is scheduled after (e.g., later than) an uplink grant, which may enable the base station to retransmit lost or failed communications more efficiently. Further, a UE may more efficiently transmit feedback information for downlink transmissions by using PUSCH resources for feedback transmissions (e.g., rather than waiting for resources indicated by later uplink grant or periodically scheduled resources).

Figure 7:
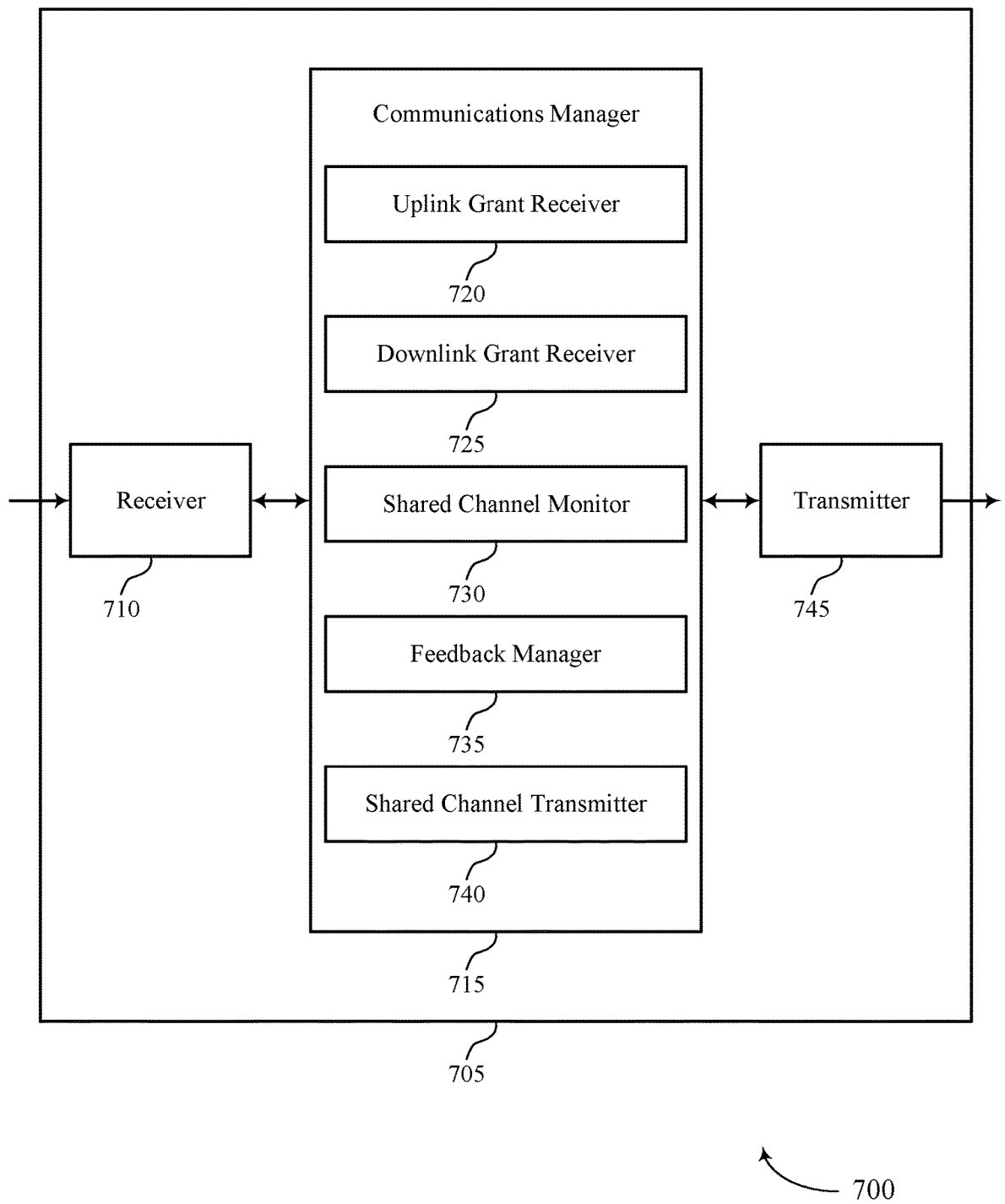

FIG. 7 shows a block diagram 700 of a device 705 that supports feedback transmissions using uplink shared channel in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to feedback transmissions using uplink shared channel, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include an uplink grant receiver 720, a downlink grant receiver 725, a shared channel monitor 730, a feedback manager 735, and a shared channel transmitter 740. The communications manager 715 may be an example of aspects of the communications manager 910 described herein.

The uplink grant receiver 720 may receive an uplink grant that indicates scheduling information for an uplink shared channel transmission for the UE.

The downlink grant receiver 725 may receive a downlink grant after receiving the uplink grant, the downlink grant indicating scheduling information for a downlink shared channel transmission for the UE or a release of periodically scheduled resources for the UE.

The shared channel monitor 730 may monitor for the downlink shared channel transmission based on the scheduling information for the downlink shared channel transmission.

The feedback manager 735 may generate feedback information based on the downlink grant.

The shared channel transmitter 740 may perform the uplink shared channel transmission including the feedback information for the downlink shared channel transmission based on the scheduling information for the uplink shared channel transmission.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
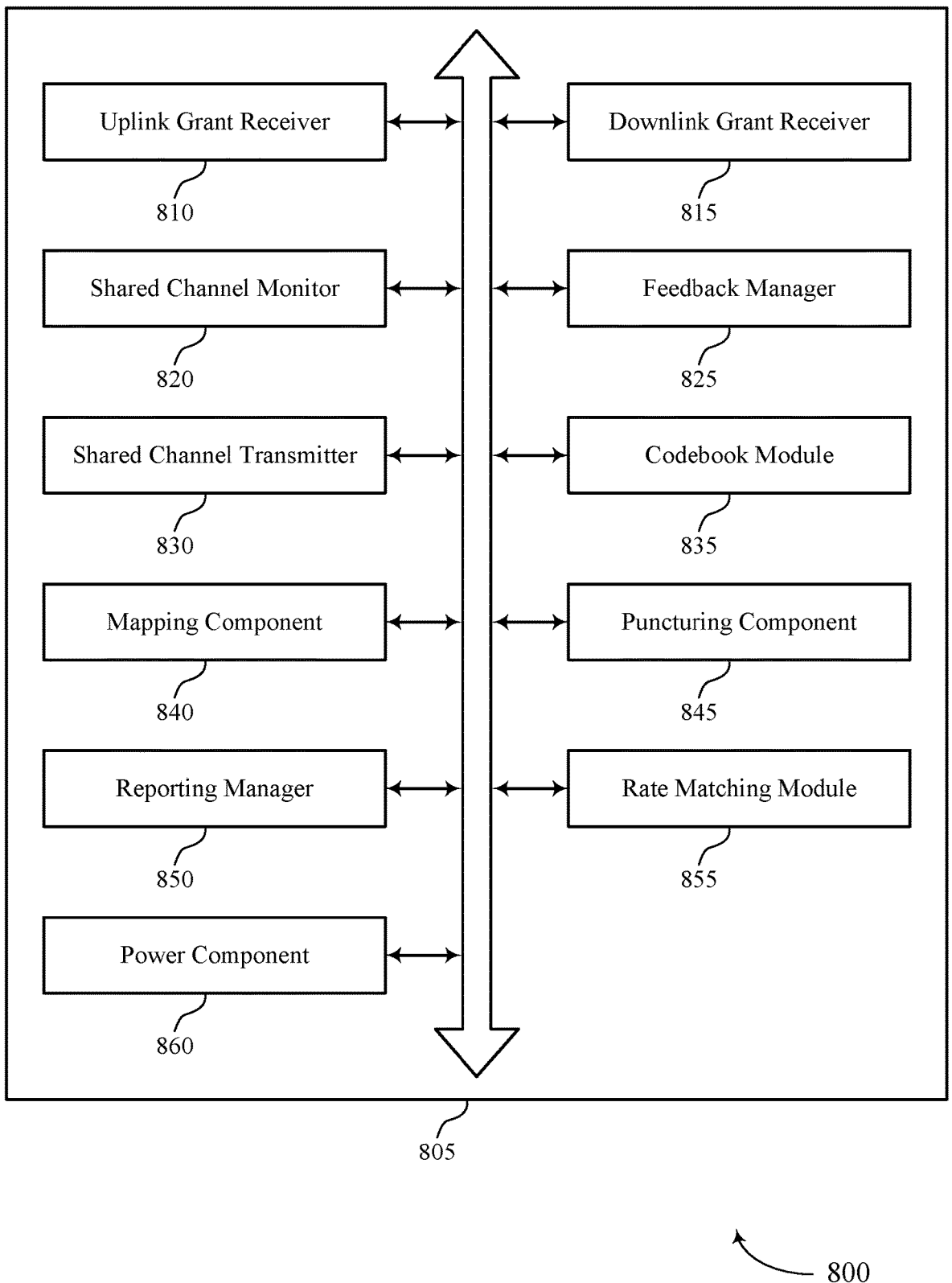
FIG. 8 shows a block diagram of a communications manager that supports feedback transmissions using uplink shared channel in accordance with aspects of the present disclosure.

FIG. 8 shows a block diagram 800 of a communications manager 805 that supports feedback transmissions using uplink shared channel in accordance with aspects of the present disclosure. The communications manager 805 may be an example of aspects of a communications manager 615, a communications manager 715, or a communications manager 910 described herein. The communications manager 805 may include an uplink grant receiver 810, a downlink grant receiver 815, a shared channel monitor 820, a feedback manager 825, a shared channel transmitter 830, a codebook module 835, a mapping component 840, a puncturing component 845, a reporting manager 850, a rate matching module 855, and a power component 860. Each of these modules may communicate, directly or indirectly, with one another (e.g., via one or more buses).

The uplink grant receiver 810 may receive an uplink grant that indicates scheduling information for an uplink shared channel transmission for the UE.

The downlink grant receiver 815 may receive a downlink grant after receiving the uplink grant, the downlink grant indicating scheduling information for a downlink shared channel transmission for the UE or a release of periodically scheduled resources for the UE. In some examples, the downlink grant receiver 815 may receive a second downlink grant before receiving the uplink grant, the second downlink grant indicating scheduling information for a second downlink shared channel transmission for the UE.

The shared channel monitor 820 may monitor for the downlink shared channel transmission based on the scheduling information for the downlink shared channel transmission. In some examples, the shared channel monitor 820 may monitor for the second downlink shared channel transmission based on the scheduling information for the second downlink shared channel transmission.

The feedback manager 825 may generate feedback information based on the downlink grant. In some examples, the feedback manager 825 may generate feedback information for the second downlink shared channel transmission based on the monitoring. In some cases, the feedback manager 825 may identify a set of resources for the feedback information for the downlink shared channel transmission based on a modulation and coding scheme of the uplink shared channel transmission. In some aspects, the feedback information for the downlink shared channel includes HARQ-ACK feedback corresponding to the downlink shared channel. In some instances, the feedback information for the second downlink shared channel includes HARQ-ACK feedback corresponding to the second downlink shared channel.

The shared channel transmitter 830 may perform the uplink shared channel transmission including the feedback information for the downlink shared channel transmission based on the scheduling information for the uplink shared channel transmission. In some examples, the shared channel transmitter 830 may perform the uplink shared channel transmission including the feedback information for the second downlink shared channel transmission. In some cases, the shared channel transmitter 830 may perform the uplink shared channel transmission including the CSI report. In some aspects, the shared channel transmitter 830 may perform the uplink shared channel transmission based on the transmission power control command. In some instances, the shared channel transmitter 830 may include the feedback information for the downlink shared channel transmission in the uplink shared channel transmission based on at least one of a codebook size, a codebook type, an uplink shared channel transmission duration, a modulation coding scheme, a timeline, a UE capability, or any combination thereof. In some cases, the timeline is associated with a processing time for preparing the feedback information for the downlink shared channel transmission or a threshold number of symbols.

The codebook module 835 may generate a first codebook associated with the feedback information for the downlink shared channel transmission. In some examples, the codebook module 835 may generate a second codebook associated with the feedback information for the second downlink shared channel transmission, the second codebook separate from the first codebook. In some cases, the codebook module 835 may identify a semi-static codebook configuration associated with a semi-static HARQ-ACK feedback codebook for downlink shared channels. In some aspects, generating the uplink shared channel transmission may be based on the semi-static codebook configuration, where generating includes including the feedback information for the downlink shared channel transmission in corresponding locations of the semi-static HARQ-ACK codebook.

The mapping component 840 may map a set of feedback bits of the first codebook and the second codebook to a set of resources identified by the scheduling information for the uplink shared channel transmission. In some examples, the mapping component 840 may map information bits of the uplink shared channel transmission around the set of resources. In some cases, the mapping component 840 may map the set of feedback bits of the first codebook to a first subset of resources. In some aspects, the mapping component 840 may map the set of feedback bits of the second codebook to a second subset of resources, where the second subset and the first subset are non-overlapping. In some instances, the mapping component 840 may map the set of feedback bits of the first codebook to at least one symbol following a set of symbols associated with a DMRS, the set of feedback bits of the second codebook, and CSI feedback.

In some examples, the mapping component 840 may map the set of feedback bits of the first codebook to at least one symbol following a set of symbols associated with a corresponding uplink control channel. In some aspects, the mapping component 840 may map a set of feedback bits of the second codebook to a set of resources identified by the scheduling information for the uplink shared channel transmission. In some cases, the mapping component 840 may map information bits of the uplink shared channel transmission around the set of resources. In some instances, the mapping component 840 may map a set of feedback bits of the first codebook to resources corresponding to the punctured subset of the mapped information bits.

In some examples, the mapping component 840 may map a second set of feedback bits of the first codebook to the punctured subset of the mapped set of feedback bits of the second codebook. In some cases, the mapping component 840 may map the CSI report to a set of resources identified by the scheduling information for the uplink shared channel transmission. In some aspects, the mapping component 840 may map a set of feedback bits of a first codebook associated with the downlink shared channel to resources corresponding to the punctured subset of the rate matched information bits. In some instances, the mapping component 840 may map a set of feedback bits of the first codebook to resources corresponding to the punctured subset of the CSI report. In some examples, the mapping component 840 may map information bits of the uplink shared channel transmission to a set of resources identified by the scheduling information for the uplink shared channel transmission. In some aspects, the mapping component 840 may map a set of feedback bits corresponding to the feedback information for the downlink shared channel transmission to at least a portion of resources corresponding to the punctured subset of the mapped information bits.

The puncturing component 845 may puncture a subset of the mapped information bits. In some examples, the puncturing component 845 may puncture a subset of the CSI report. In some aspects, the puncturing component 845 may puncture a subset of the rate matched information bits.

The reporting manager 850 may generate a CSI report. In some examples, the reporting manager 850 may transmit a report of the UE capability to a base station, the UE capability including an indication of the feedback information for the downlink shared channel transmission or a processing time associated with the UE.

The rate matching module 855 may rate match information bits of the uplink shared channel transmission around the set of resources.

The power component 860 may identify a transmission power control command for adjusting a transmission power of the uplink shared channel transmission. In some examples, the power component 860 may receive an indication of the transmission power control command in the downlink grant, the transmission power control command indicating an adjustment of the transmission power of the uplink shared channel transmission with respect to a previous transmission power control command. In some cases, the previous transmission power control command is indicated by the uplink grant.

Figure 9:
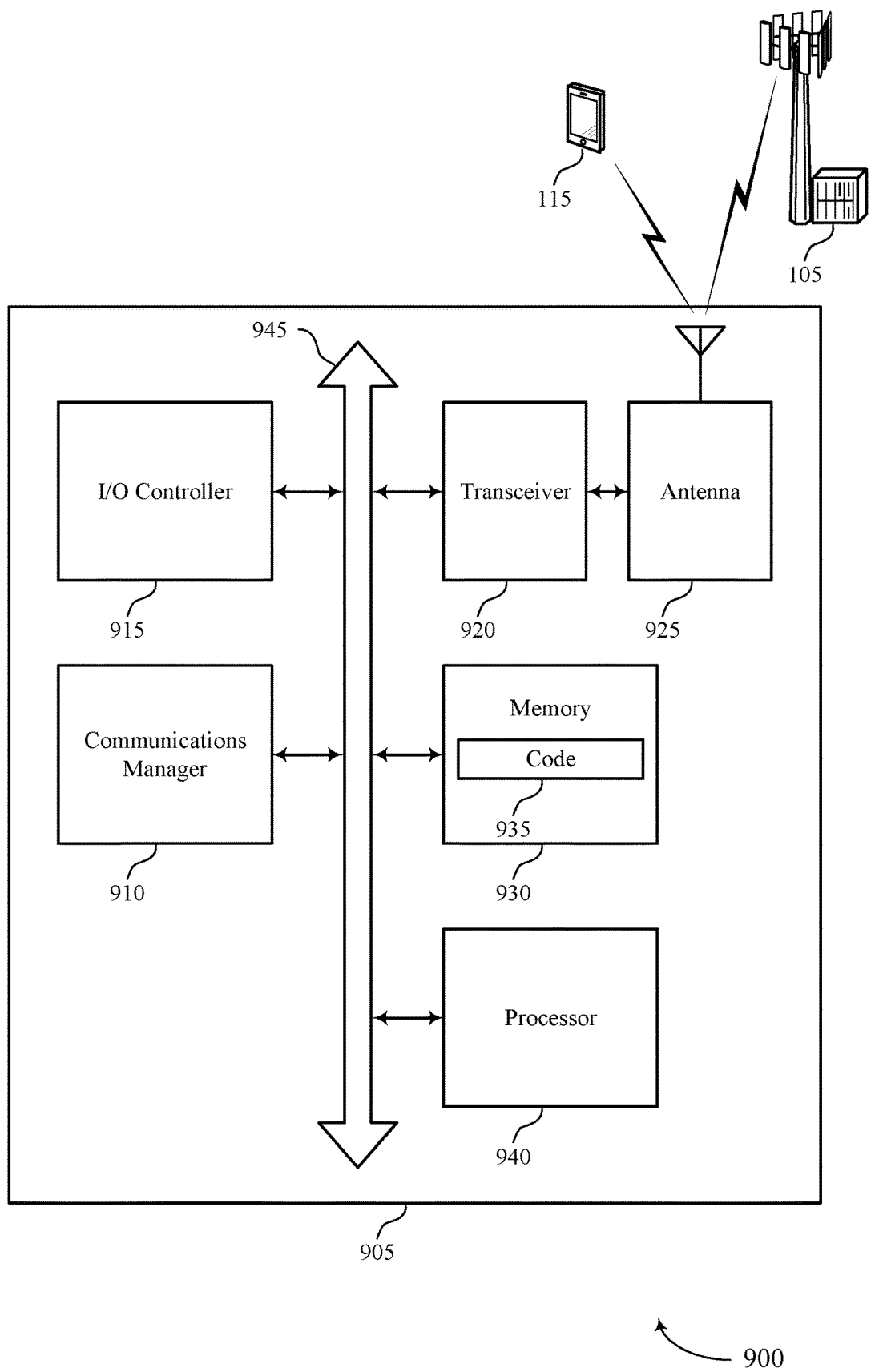
FIG. 9 shows a diagram of a system including a device that supports feedback transmissions using uplink shared channel in accordance with aspects of the present disclosure.

FIG. 9 shows a diagram of a system 900 including a device 905 that supports feedback transmissions using uplink shared channel in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive an uplink grant that indicates scheduling information for an uplink shared channel transmission for the UE, receive a downlink grant after receiving the uplink grant, the downlink grant indicating scheduling information for a downlink shared channel transmission for the UE or a release of periodically scheduled resources for the UE, monitor for the downlink shared channel transmission based on the scheduling information for the downlink shared channel transmission, generate feedback information based on the downlink grant, and perform the uplink shared channel transmission including the feedback information for the downlink shared channel transmission based on the scheduling information for the uplink shared channel transmission.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the device 905 may include a single antenna 925, or the device 905 may have more than one antenna 925, which may be capable of concurrently transmitting or receiving multiple wireless transmissions.

The memory 930 may include read only memory (RAM) and random access memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting feedback transmissions using uplink shared channel).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
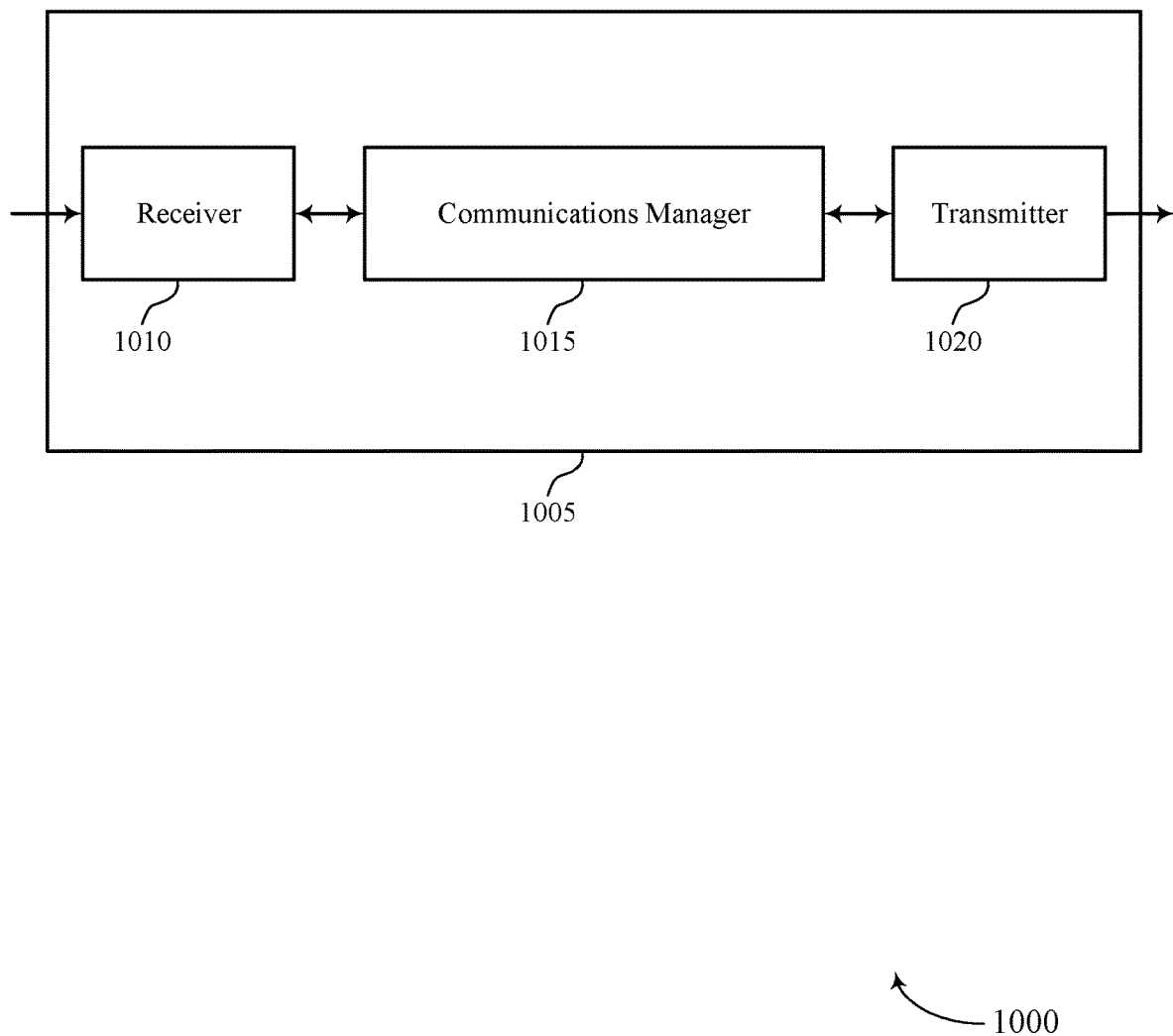
FIGS. 10 and 11 show block diagrams of devices that support feedback transmissions using uplink shared channel in accordance with aspects of the present disclosure.

FIG. 10 shows a block diagram 1000 of a device 1005 that supports feedback transmissions using uplink shared channel in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to feedback transmissions using uplink shared channel, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit an uplink grant that indicates scheduling information for an uplink shared channel transmission for a UE. The communications manager 1015 may transmit a downlink grant after transmitting the uplink grant, the downlink grant indicating scheduling information for a downlink shared channel transmission for the UE or a release of periodically scheduled resources for the UE. The communications manager 1015 may monitor for the uplink shared channel transmission from the UE based on the scheduling information for the uplink shared channel transmission, the uplink shared channel transmission including feedback information for the downlink shared channel transmission. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
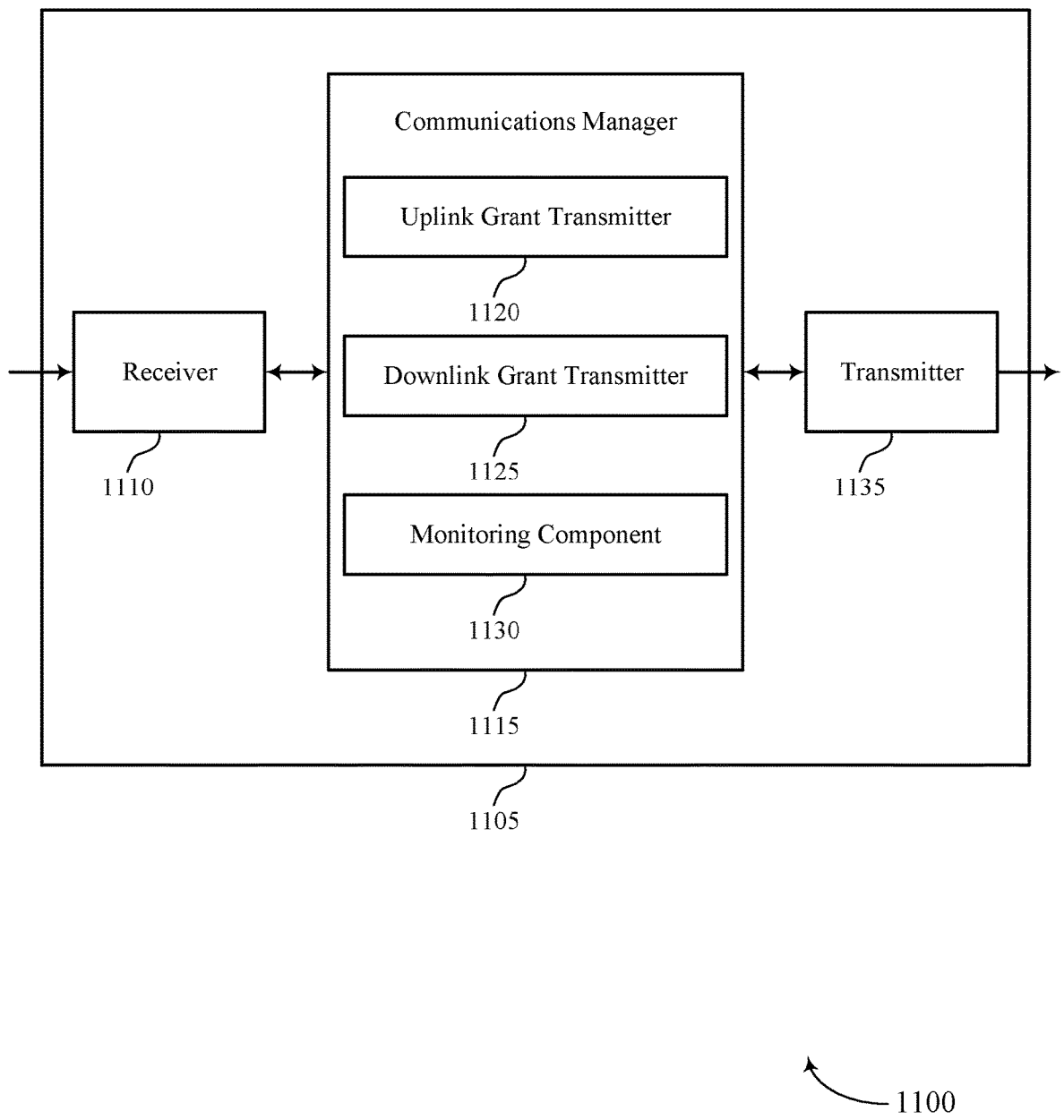

FIG. 11 shows a block diagram 1100 of a device 1105 that supports feedback transmissions using uplink shared channel in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to feedback transmissions using uplink shared channel, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an uplink grant transmitter 1120, a downlink grant transmitter 1125, and a monitoring component 1130. The communications manager 1115 may be an example of aspects of the communications manager 1310 described herein.

The uplink grant transmitter 1120 may transmit an uplink grant that indicates scheduling information for an uplink shared channel transmission for a UE.

The downlink grant transmitter 1125 may transmit a downlink grant after transmitting the uplink grant, the downlink grant indicating scheduling information for a downlink shared channel transmission for the UE or a release of periodically scheduled resources for the UE.

The monitoring component 1130 may monitor for the uplink shared channel transmission from the UE based on the scheduling information for the uplink shared channel transmission, the uplink shared channel transmission including feedback information for the downlink shared channel transmission.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
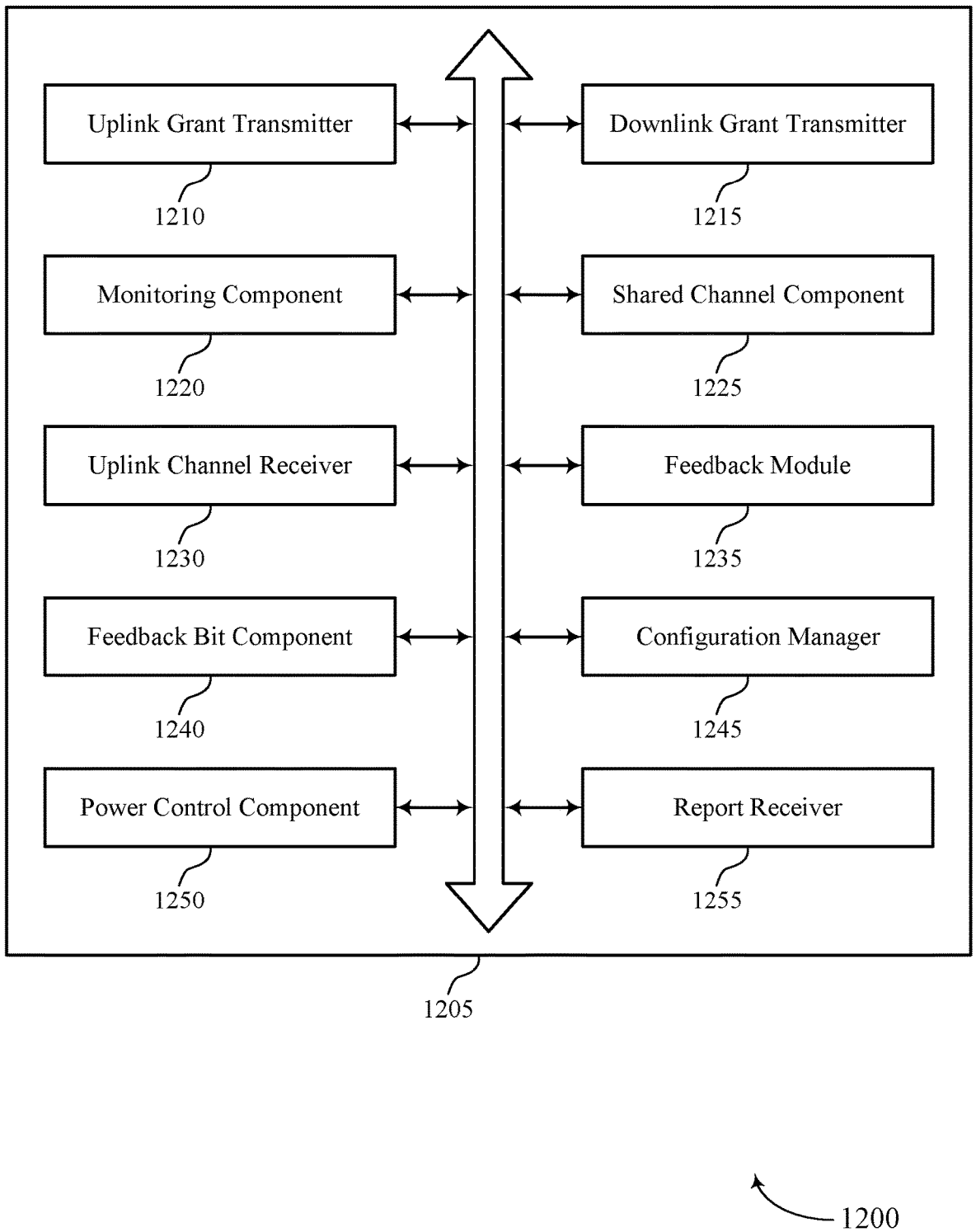
FIG. 12 shows a block diagram of a communications manager that supports feedback transmissions using uplink shared channel in accordance with aspects of the present disclosure.

FIG. 12 shows a block diagram 1200 of a communications manager 1205 that supports feedback transmissions using uplink shared channel in accordance with aspects of the present disclosure. The communications manager 1205 may be an example of aspects of a communications manager 1015, a communications manager 1115, or a communications manager 1310 described herein. The communications manager 1205 may include an uplink grant transmitter 1210, a downlink grant transmitter 1215, a monitoring component 1220, a shared channel component 1225, an uplink channel receiver 1230, a feedback module 1235, a feedback bit component 1240, a configuration manager 1245, a power control component 1250, and a report receiver 1255. Each of these modules may communicate, directly or indirectly, with one another (e.g., via one or more buses).

The uplink grant transmitter 1210 may transmit an uplink grant that indicates scheduling information for an uplink shared channel transmission for a UE.

The downlink grant transmitter 1215 may transmit a downlink grant after transmitting the uplink grant, the downlink grant indicating scheduling information for a downlink shared channel transmission for the UE or a release of periodically scheduled resources for the UE. In some examples, the downlink grant transmitter 1215 may transmit a second downlink grant before transmitting the uplink grant, the second downlink grant indicating scheduling information for a second downlink shared channel transmission for the UE.

The monitoring component 1220 may monitor for the uplink shared channel transmission from the UE based on the scheduling information for the uplink shared channel transmission, the uplink shared channel transmission including feedback information for the downlink shared channel transmission. In some cases, the feedback information for the downlink shared channel includes HARQ-ACK feedback corresponding to the downlink shared channel.

The shared channel component 1225 may transmit the second downlink shared channel transmission based on the scheduling information for the second downlink shared channel transmission. In some examples, the shared channel component 1225 may receive the uplink shared channel transmission based on the semi-static codebook configuration, where feedback information for the downlink shared channel transmission is assigned to corresponding locations of the semi-static codebook based on the semi-static HARQ-ACK codebook configuration.

The uplink channel receiver 1230 may receive the uplink shared channel transmission from the UE based on the scheduling information for the uplink shared channel transmission, the uplink shared channel transmission including feedback information for the second downlink shared channel transmission. In some examples, the uplink channel receiver 1230 may receive the uplink shared channel transmission from the UE based on the scheduling information for the uplink shared channel transmission, the uplink shared channel transmission including a CSI report. In some cases, the feedback information for the second downlink shared channel includes HARQ-ACK feedback corresponding to the second downlink shared channel. In some aspects, a set of feedback bits of a first codebook associated with the downlink shared channel are mapped to a punctured subset of information bits of the uplink shared channel rate matched around a set of resources corresponding to the CSI report. In some instances, the CSI report is mapped to a set of resources identified by the scheduling information for the uplink shared channel transmission.

The feedback module 1235 may determine feedback information for at least one of the first and second downlink shared channel transmissions, where the uplink shared channel transmission includes a first codebook associated with feedback information for the downlink shared channel transmission and a second codebook associated with feedback information for the second downlink shared channel transmission separate from the first codebook.

The feedback bit component 1240 may determine a set of feedback bits of the first codebook based on receiving the uplink shared channel transmission, where the set of feedback bits puncture a mapped set of information bits associated with the uplink shared channel transmission. In some cases, the uplink shared channel transmission includes a set of feedback bits of the first codebook and the second codebook mapped to a set of resources identified by the scheduling information for the uplink shared channel transmission and a set of information bits mapped around the set of resources. In some examples, a subset of feedback bits of the first codebook is mapped to a first subset of resources non-overlapping with a second subset of resources associated with a mapped subset of feedback bits of the second codebook. In some aspects, the set of feedback bits of the first codebook is mapped at least one symbol following a set of symbols associated with a DMRS, the set of feedback bits of the second codebook, and CSI feedback. In some instances, the set of feedback bits of the first codebook is mapped to at least one symbol following a set of symbols associated with a corresponding uplink control channel. In some cases, the set of feedback bits puncture a mapped set of feedback bits of the second codebook.

The configuration manager 1245 may transmit an indication of a semi-static HARQ-ACK feedback codebook configuration associated with a semi-static codebook for downlink shared channels. In some cases, the indication of the semi-static codebook configuration is transmitted via control signaling.

The power control component 1250 may transmit an indication of a transmission power control command in the downlink grant, the transmission power control command indicating an adjustment of a transmission power of the uplink shared channel transmission with respect to a previous transmission power control command. In some examples, the power control component 1250 may include the previous transmission power control command in the uplink grant.

The report receiver 1255 may receive a report of a UE capability from the UE, the UE capability including an indication of feedback information for the downlink shared channel transmission or a processing time associated with the UE.

Figure 13:
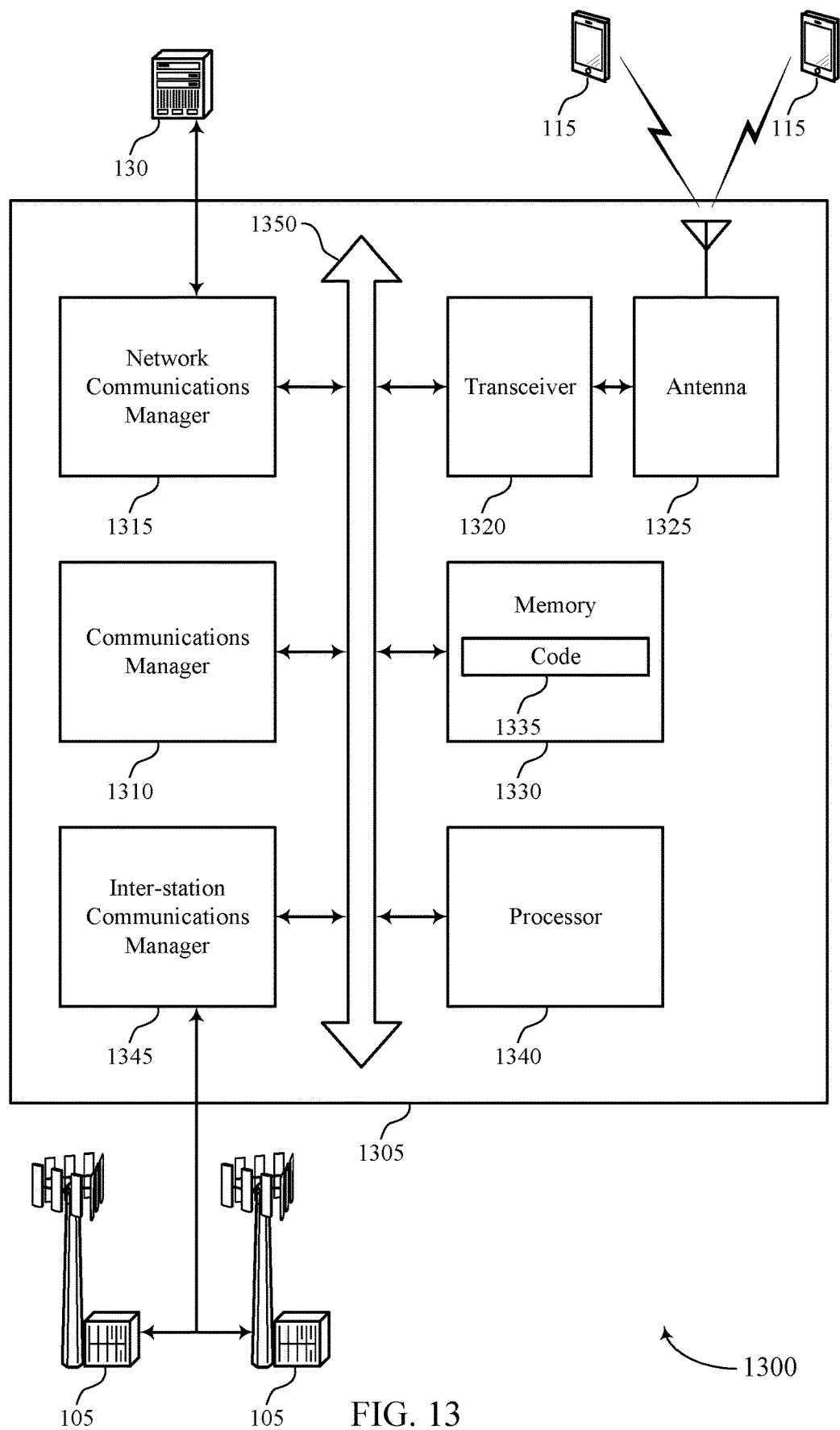
FIG. 13 shows a diagram of a system including a device that supports feedback transmissions using uplink shared channel in accordance with aspects of the present disclosure.

FIG. 13 shows a diagram of a system 1300 including a device 1305 that supports feedback transmissions using uplink shared channel in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit an uplink grant that indicates scheduling information for an uplink shared channel transmission for a UE. The communications manager 1310 may transmit a downlink grant after transmitting the uplink grant, the downlink grant indicating scheduling information for a downlink shared channel transmission for the UE or a release of periodically scheduled resources for the UE. The communications manager 1310 may monitor for the uplink shared channel transmission from the UE based on the scheduling information for the uplink shared channel transmission, the uplink shared channel transmission including feedback information for the downlink shared channel transmission.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the device 1305 may include a single antenna 1325, or the device 1305 may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting feedback transmissions using uplink shared channel).

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
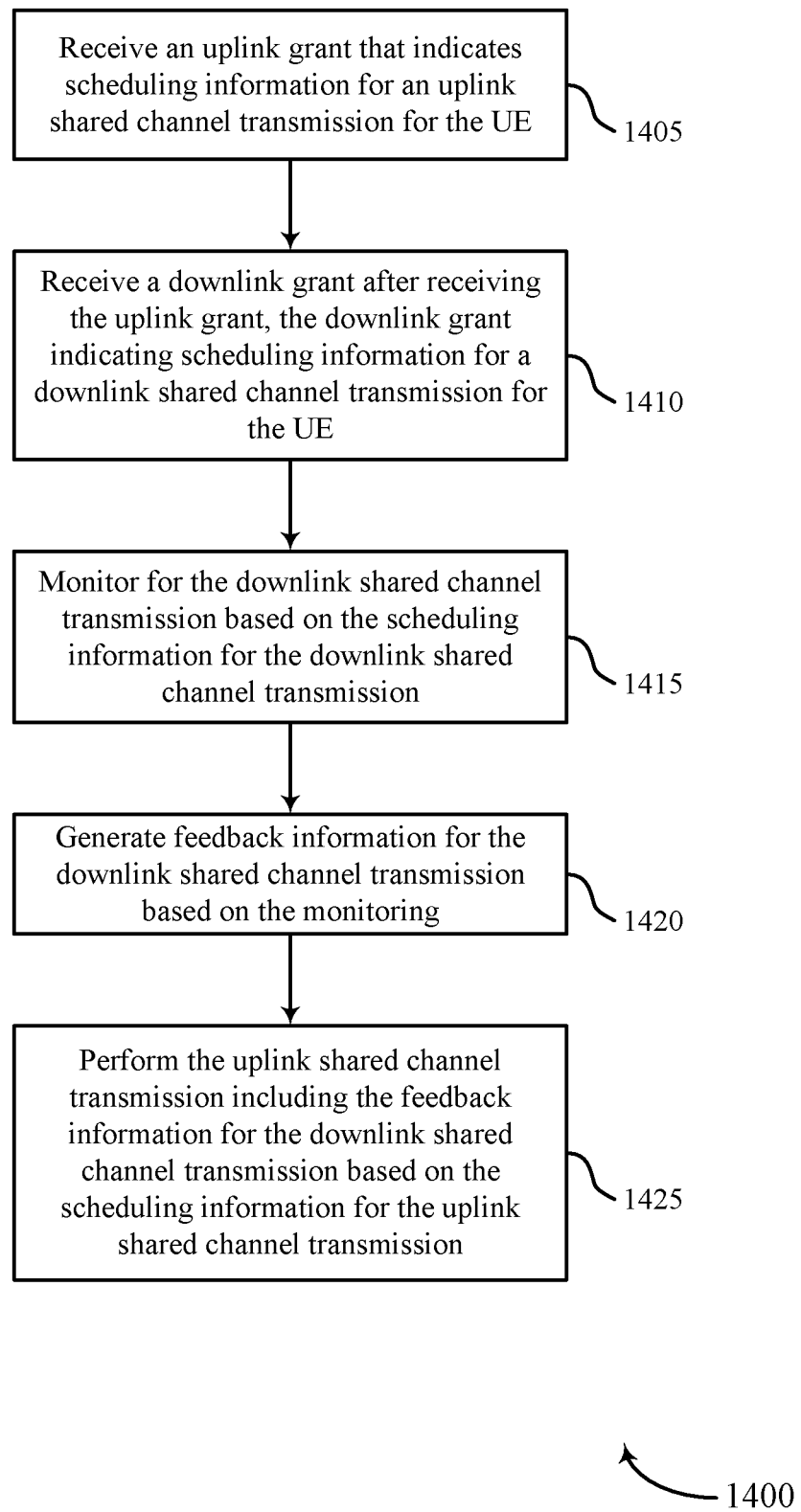
FIGS. 14 through 20 show flowcharts illustrating methods that support feedback transmissions using uplink shared channel in accordance with aspects of the present disclosure.

FIG. 14 shows a flowchart illustrating a method 1400 that supports feedback transmissions using uplink shared channel in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive an uplink grant that indicates scheduling information for an uplink shared channel transmission for the UE. The operations of 1405 may be performed according to the methods described herein. In some examples, aspects of the operations of 1405 may be performed by an uplink grant receiver as described with reference to FIGS. 6 through 9.

At 1410, the UE may receive a downlink grant after receiving the uplink grant, the downlink grant indicating scheduling information for a downlink shared channel transmission for the UE or a release of periodically scheduled resources for the UE. The operations of 1410 may be performed according to the methods described herein. In some examples, aspects of the operations of 1410 may be performed by a downlink grant receiver as described with reference to FIGS. 6 through 9.

At 1415, the UE may optionally monitor for the downlink shared channel transmission based on the scheduling information for the downlink shared channel transmission. The operations of 1415 may be performed according to the methods described herein. In some examples, aspects of the operations of 1415 may be performed by a shared channel monitor as described with reference to FIGS. 6 through 9.

At 1420, the UE may generate feedback information based on the downlink grant. The operations of 1420 may be performed according to the methods described herein. In some examples, aspects of the operations of 1420 may be performed by a feedback manager as described with reference to FIGS. 6 through 9.

At 1425, the UE may perform the uplink shared channel transmission including the feedback information for the downlink shared channel transmission based on the scheduling information for the uplink shared channel transmission. The operations of 1425 may be performed according to the methods described herein. In some examples, aspects of the operations of 1425 may be performed by a shared channel transmitter as described with reference to FIGS. 6 through 9.

Figure 15:
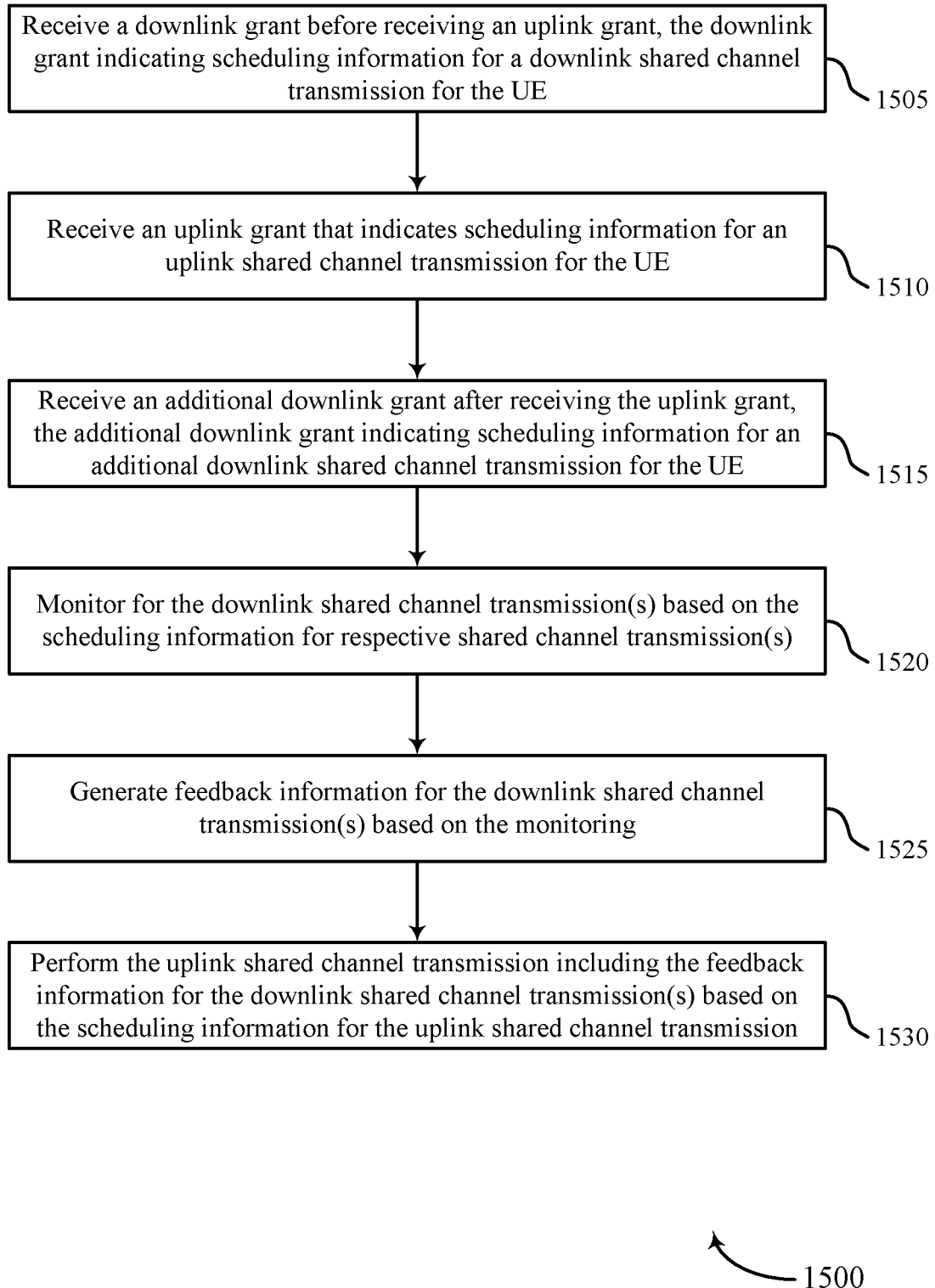

FIG. 15 shows a flowchart illustrating a method 1500 that supports feedback transmissions using uplink shared channel in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive a downlink grant before receiving an uplink grant, the downlink grant indicating scheduling information for a downlink shared channel transmission for the UE or a release of periodically scheduled resources for the UE. The operations of 1505 may be performed according to the methods described herein. In some examples, aspects of the operations of 1505 may be performed by a downlink grant receiver as described with reference to FIGS. 6 through 9.

At 1510, the UE may receive an uplink grant that indicates scheduling information for an uplink shared channel transmission for the UE. The operations of 1510 may be performed according to the methods described herein. In some examples, aspects of the operations of 1510 may be performed by an uplink grant receiver as described with reference to FIGS. 6 through 9.

At 1515, the UE may receive an additional downlink grant after receiving the uplink grant, the additional downlink grant indicating scheduling information for an additional downlink shared channel transmission for the UE. The operations of 1515 may be performed according to the methods described herein. In some examples, aspects of the operations of 1515 may be performed by a downlink grant receiver as described with reference to FIGS. 6 through 9.

At 1520, the UE may monitor for the downlink shared channel transmission(s) (e.g., downlink shared channel and additional downlink shared channel) based on the scheduling information for respective shared channel transmission(s) (e.g., indicated in respective downlink grants). The operations of 1520 may be performed according to the methods described herein. In some examples, aspects of the operations of 1520 may be performed by a shared channel monitor as described with reference to FIGS. 6 through 9.

At 1525, the UE may generate feedback information for the downlink shared channel transmission(s) based on the monitoring. The operations of 1525 may be performed according to the methods described herein. In some examples, aspects of the operations of 1525 may be performed by a feedback manager as described with reference to FIGS. 6 through 9.

At 1530, the UE may perform the uplink shared channel transmission including the feedback information for the downlink shared channel transmission(s) based on the scheduling information for the uplink shared channel transmission. The operations of 1530 may be performed according to the methods described herein. In some examples, aspects of the operations of 1530 may be performed by a shared channel transmitter as described with reference to FIGS. 6 through 9.

Figure 16:
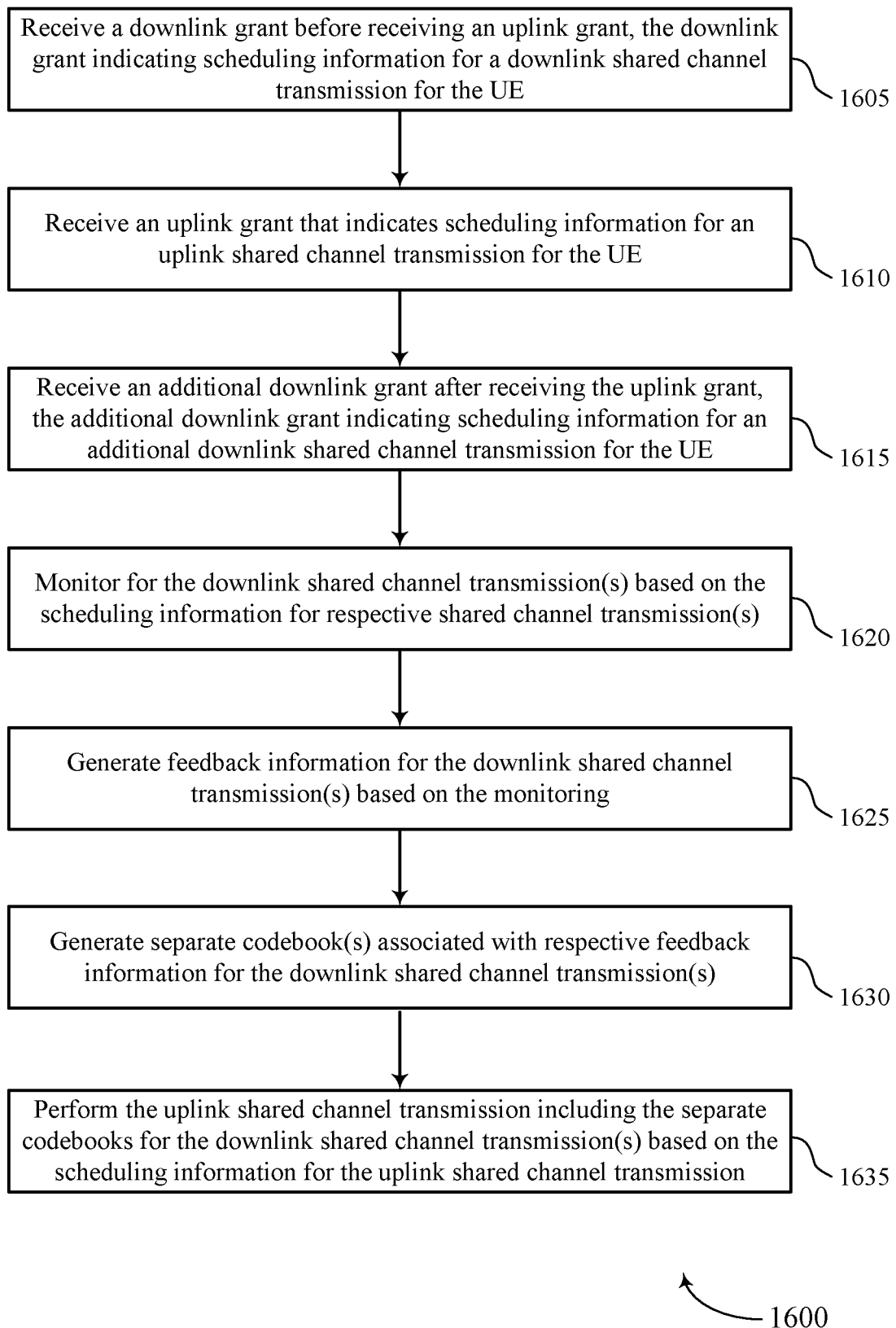

FIG. 16 shows a flowchart illustrating a method 1600 that supports feedback transmissions using uplink shared channel in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive a downlink grant before receiving an uplink grant, the downlink grant indicating scheduling information for a downlink shared channel transmission for the UE or a release of periodically scheduled resources for the UE. The operations of 1605 may be performed according to the methods described herein. In some examples, aspects of the operations of 1605 may be performed by a downlink grant receiver as described with reference to FIGS. 6 through 9.

At 1610, the UE may receive an uplink grant that indicates scheduling information for an uplink shared channel transmission for the UE. The operations of 1610 may be performed according to the methods described herein. In some examples, aspects of the operations of 1610 may be performed by an uplink grant receiver as described with reference to FIGS. 6 through 9.

At 1615, the UE may receive an additional downlink grant after receiving the uplink grant, the additional downlink grant indicating scheduling information for an additional downlink shared channel transmission for the UE. The operations of 1615 may be performed according to the methods described herein. In some examples, aspects of the operations of 1615 may be performed by a downlink grant receiver as described with reference to FIGS. 6 through 9.

At 1620, the UE may monitor for the downlink shared channel transmission(s) based on the scheduling information for respective shared channel transmission(s). The operations of 1620 may be performed according to the methods described herein. In some examples, aspects of the operations of 1620 may be performed by a shared channel monitor as described with reference to FIGS. 6 through 9.

At 1625, the UE may generate feedback information for the downlink shared channel transmission(s) based on the monitoring. The operations of 1625 may be performed according to the methods described herein. In some examples, aspects of the operations of 1625 may be performed by a feedback manager as described with reference to FIGS. 6 through 9.

At 1630, the UE may generate separate codebook(s) associated with respective feedback information for the downlink shared channel transmission(s). The operations of 1630 may be performed according to the methods described herein. In some examples, aspects of the operations of 1630 may be performed by a codebook module as described with reference to FIGS. 6 through 9.

At 1635, the UE may perform the uplink shared channel transmission including the separate codebooks for the downlink shared channel transmission(s) based on the scheduling information for the uplink shared channel transmission. The operations of 1635 may be performed according to the methods described herein. In some examples, aspects of the operations of 1635 may be performed by a shared channel transmitter as described with reference to FIGS. 6 through 9.

Figure 17:
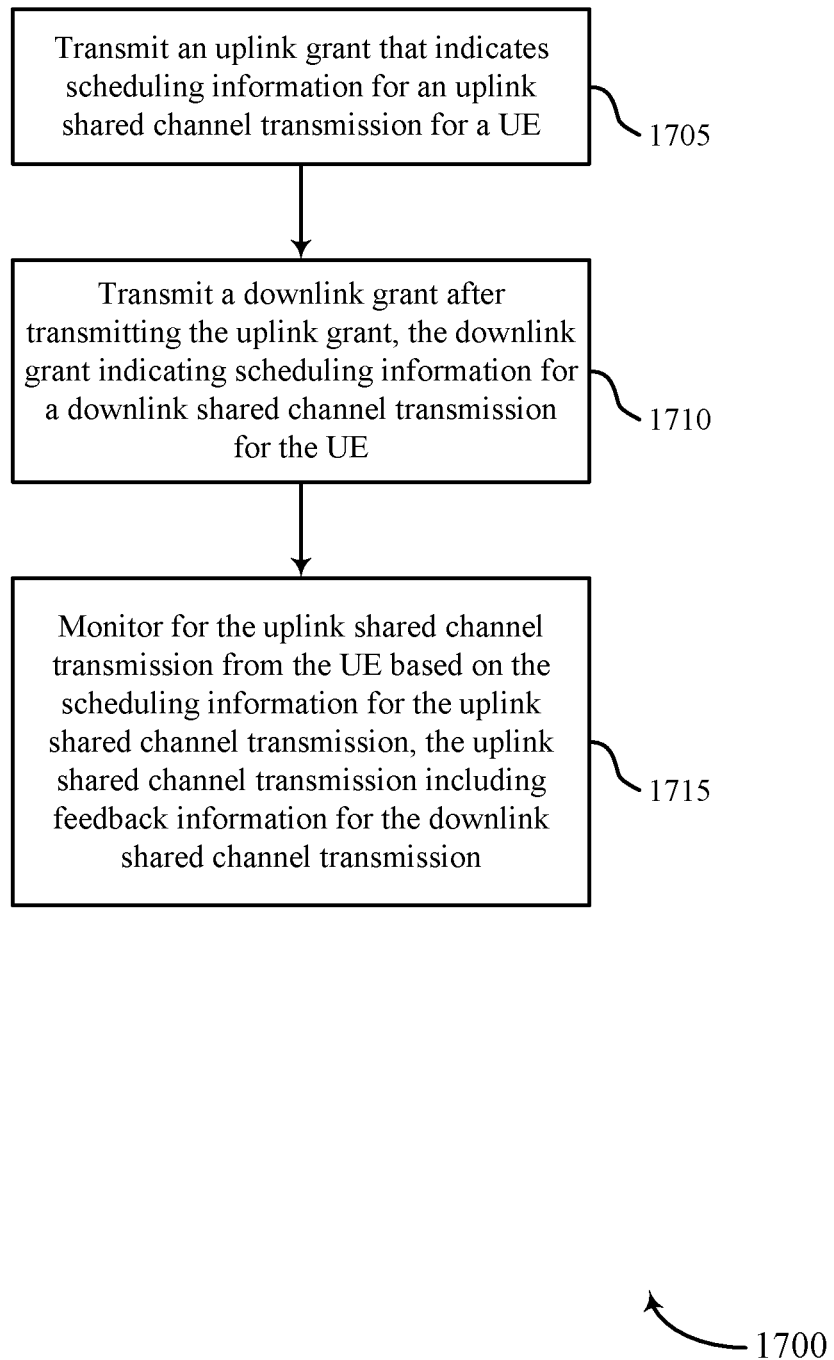

FIG. 17 shows a flowchart illustrating a method 1700 that supports feedback transmissions using uplink shared channel in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit an uplink grant that indicates scheduling information for an uplink shared channel transmission for a UE. The operations of 1705 may be performed according to the methods described herein. In some examples, aspects of the operations of 1705 may be performed by an uplink grant transmitter as described with reference to FIGS. 10 through 13.

At 1710, the base station may transmit a downlink grant after transmitting the uplink grant, the downlink grant indicating scheduling information for a downlink shared channel transmission for the UE or a release of periodically scheduled resources for the UE or a release of periodically scheduled resources for the UE. The operations of 1710 may be performed according to the methods described herein. In some examples, aspects of the operations of 1710 may be performed by a downlink grant transmitter as described with reference to FIGS. 10 through 13.

At 1715, the base station may monitor for the uplink shared channel transmission from the UE based on the scheduling information for the uplink shared channel transmission, the uplink shared channel transmission including feedback information for the downlink shared channel transmission. The operations of 1715 may be performed according to the methods described herein. In some examples, aspects of the operations of 1715 may be performed by a monitoring component as described with reference to FIGS. 10 through 13.

Figure 18:
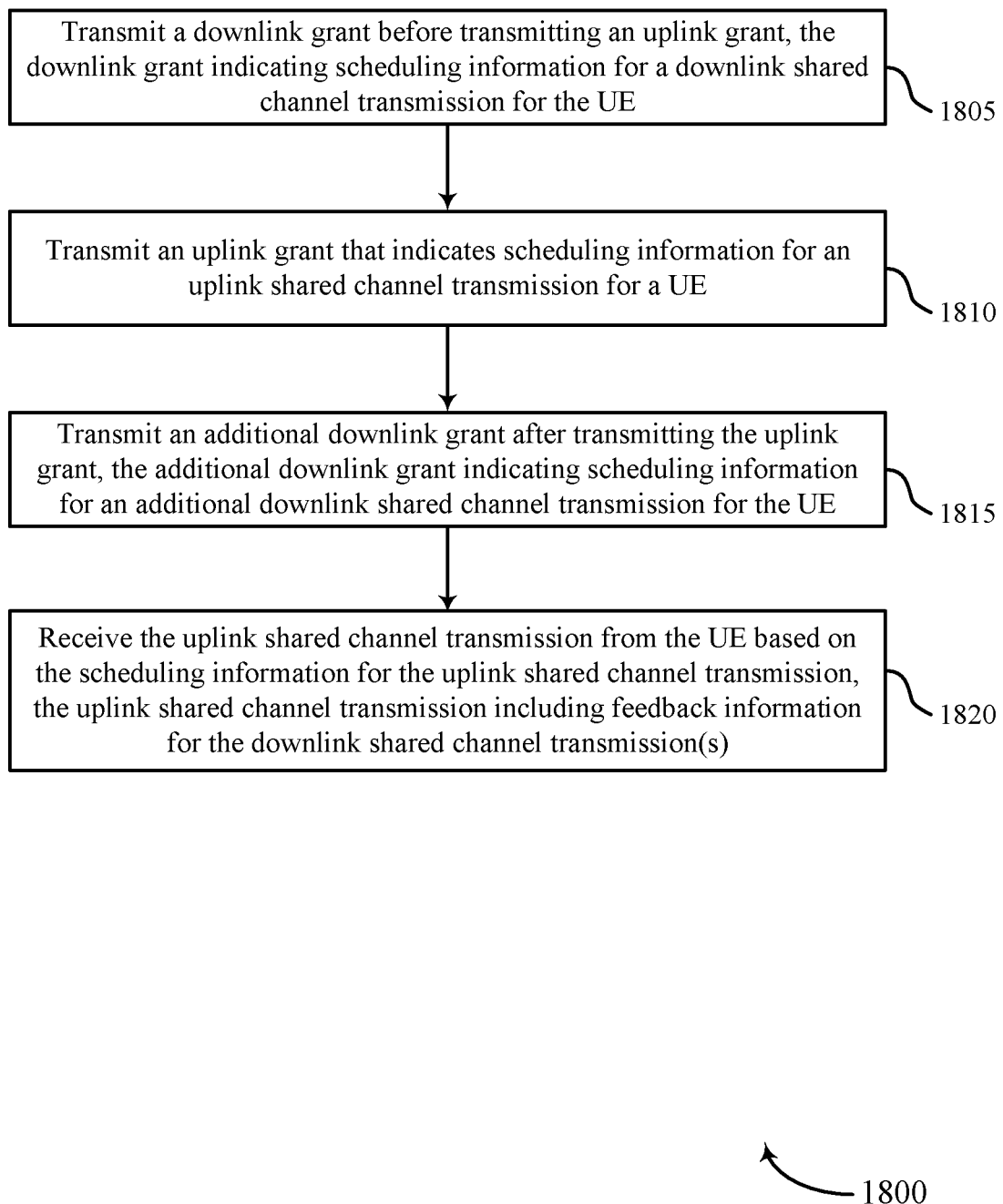

FIG. 18 shows a flowchart illustrating a method 1800 that supports feedback transmissions using uplink shared channel in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit a downlink grant before transmitting an uplink grant, the downlink grant indicating scheduling information for a downlink shared channel transmission for the UE or a release of periodically scheduled resources for the UE. The operations of 1805 may be performed according to the methods described herein. In some examples, aspects of the operations of 1805 may be performed by a downlink grant transmitter as described with reference to FIGS. 10 through 13.

At 1810, the base station may transmit an uplink grant that indicates scheduling information for an uplink shared channel transmission for a UE or a release of periodically scheduled resources for the UE. The operations of 1810 may be performed according to the methods described herein. In some examples, aspects of the operations of 1810 may be performed by an uplink grant transmitter as described with reference to FIGS. 10 through 13.

At 1815, the base station may transmit an additional downlink grant after transmitting the uplink grant, the additional downlink grant indicating scheduling information for an additional downlink shared channel transmission for the UE. The operations of 1815 may be performed according to the methods described herein. In some examples, aspects of the operations of 1815 may be performed by a downlink grant transmitter as described with reference to FIGS. 10 through 13.

At 1820, the base station may receive the uplink shared channel transmission from the UE based on the scheduling information for the uplink shared channel transmission, the uplink shared channel transmission including feedback information for the downlink shared channel transmission(s). The operations of 1820 may be performed according to the methods described herein. In some examples, aspects of the operations of 1820 may be performed by an uplink channel receiver as described with reference to FIGS. 10 through 13.

Figure 19:
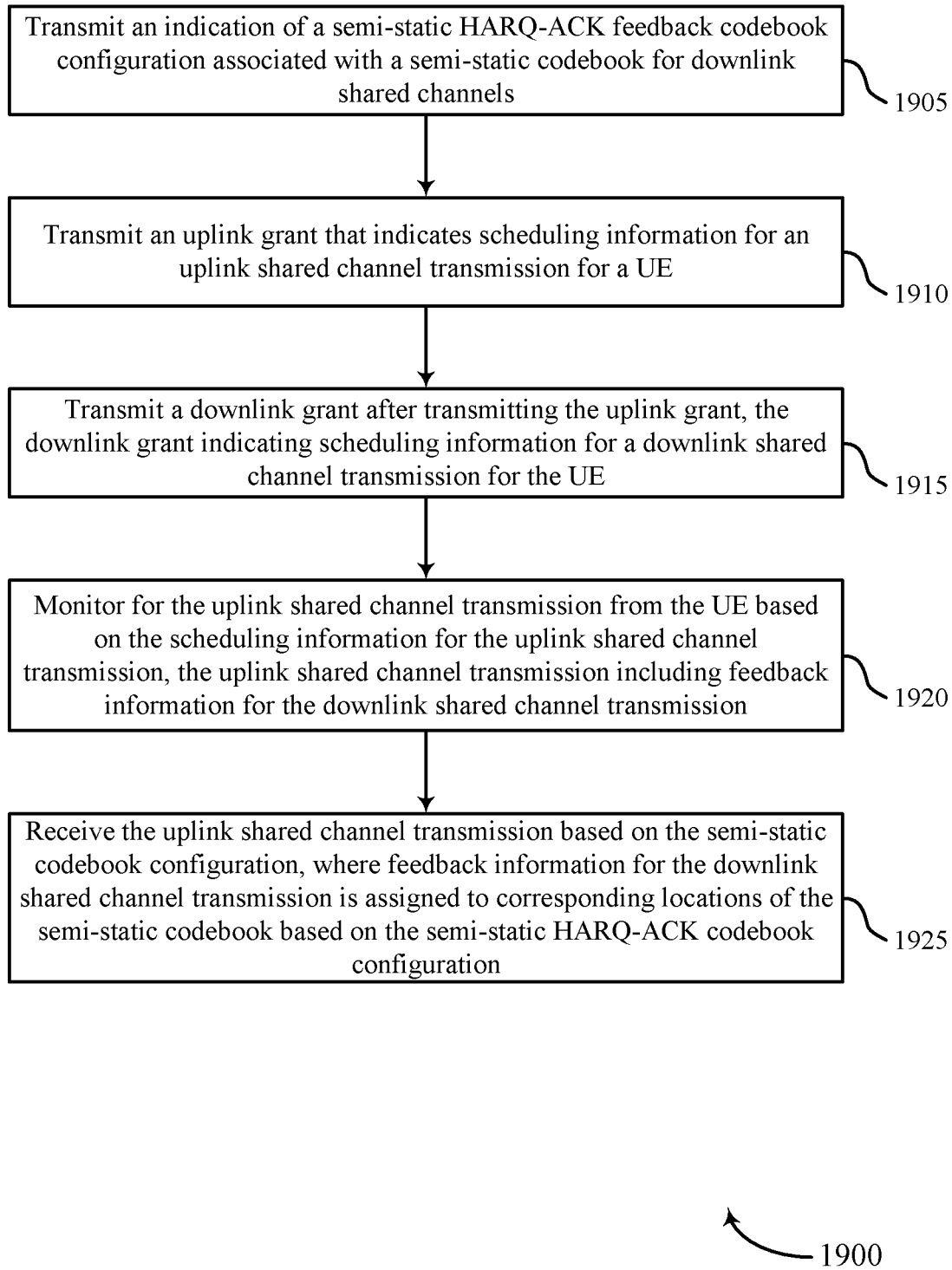

FIG. 19 shows a flowchart illustrating a method 1900 that supports feedback transmissions using uplink shared channel in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit an indication of a semi-static HARQ-ACK feedback codebook configuration associated with a semi-static codebook for downlink shared channels. The operations of 1905 may be performed according to the methods described herein. In some examples, aspects of the operations of 1905 may be performed by a configuration manager as described with reference to FIGS. 10 through 13.

At 1910, the base station may transmit an uplink grant that indicates scheduling information for an uplink shared channel transmission for a UE or a release of periodically scheduled resources for the UE. The operations of 1910 may be performed according to the methods described herein. In some examples, aspects of the operations of 1910 may be performed by an uplink grant transmitter as described with reference to FIGS. 10 through 13.

At 1915, the base station may transmit a downlink grant after transmitting the uplink grant, the downlink grant indicating scheduling information for a downlink shared channel transmission for the UE or a release of periodically scheduled resources for the UE. The operations of 1915 may be performed according to the methods described herein. In some examples, aspects of the operations of 1915 may be performed by a downlink grant transmitter as described with reference to FIGS. 10 through 13.

At 1920, the base station may monitor for the uplink shared channel transmission from the UE based on the scheduling information for the uplink shared channel transmission, the uplink shared channel transmission including feedback information for the downlink shared channel transmission. The operations of 1920 may be performed according to the methods described herein. In some examples, aspects of the operations of 1920 may be performed by a monitoring component as described with reference to FIGS. 10 through 13.

At 1925, the base station may receive the uplink shared channel transmission based on the semi-static codebook configuration, where feedback information for the downlink shared channel transmission is assigned to corresponding locations of the semi-static codebook based on the semi-static HARQ-ACK codebook configuration. The operations of 1925 may be performed according to the methods described herein. In some examples, aspects of the operations of 1925 may be performed by a shared channel component as described with reference to FIGS. 10 through 13.

Figure 20:
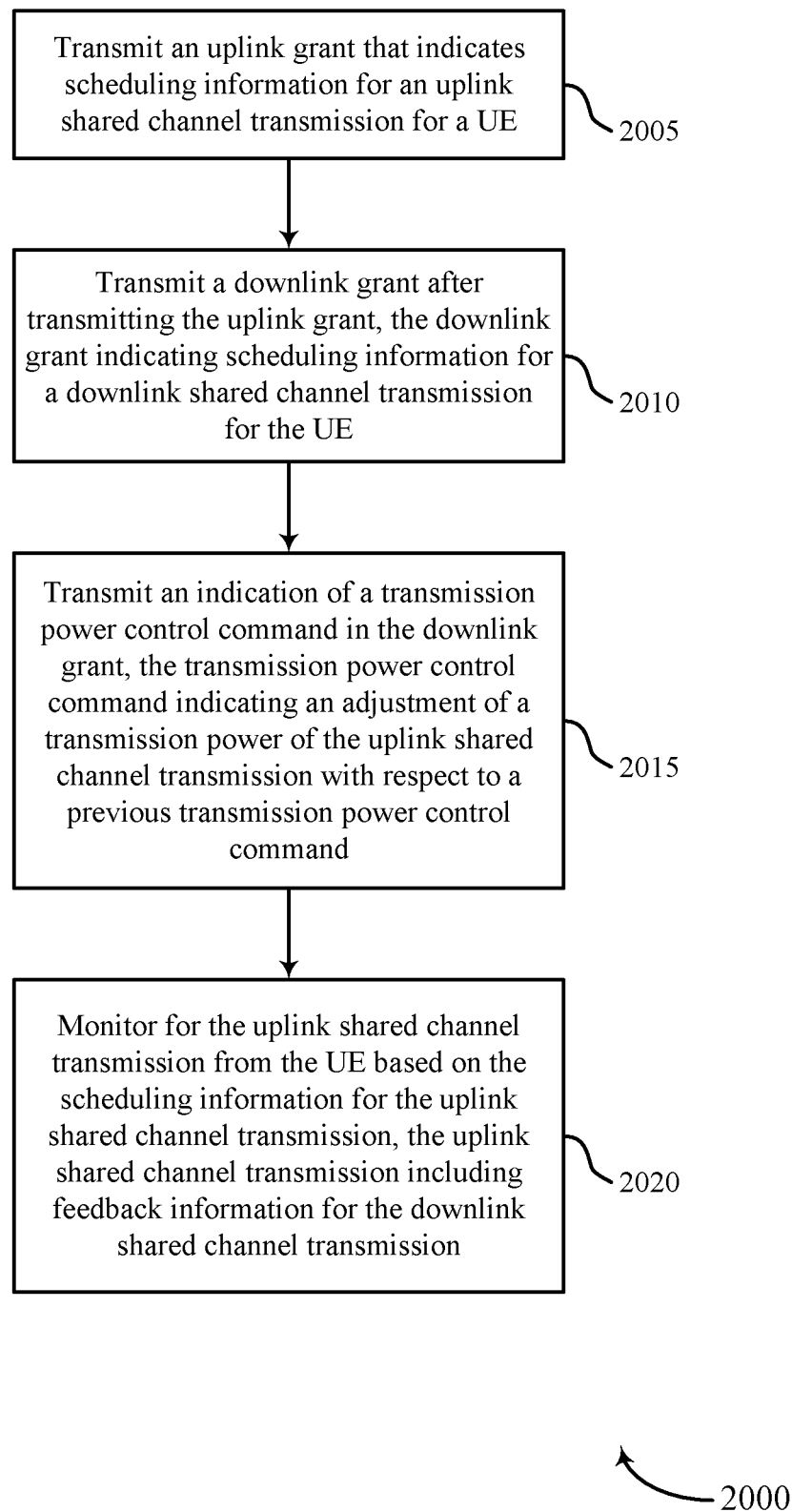

FIG. 20 shows a flowchart illustrating a method 2000 that supports feedback transmissions using uplink shared channel in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 2005, the base station may transmit an uplink grant that indicates scheduling information for an uplink shared channel transmission for a UE. The operations of 2005 may be performed according to the methods described herein. In some examples, aspects of the operations of 2005 may be performed by an uplink grant transmitter as described with reference to FIGS. 10 through 13.

At 2010, the base station may transmit a downlink grant after transmitting the uplink grant, the downlink grant indicating scheduling information for a downlink shared channel transmission for the UE or a release of periodically scheduled resources for the UE or a release of periodically scheduled resources for the UE. The operations of 2010 may be performed according to the methods described herein. In some examples, aspects of the operations of 2010 may be performed by a downlink grant transmitter as described with reference to FIGS. 10 through 13.

At 2015, the base station may transmit an indication of a transmission power control command in the downlink grant, the transmission power control command indicating an adjustment of a transmission power of the uplink shared channel transmission with respect to a previous transmission power control command. The operations of 2015 may be performed according to the methods described herein. In some examples, aspects of the operations of 2015 may be performed by a power control component as described with reference to FIGS. 10 through 13.

At 2020, the base station may monitor for the uplink shared channel transmission from the UE based on the scheduling information for the uplink shared channel transmission, the uplink shared channel transmission including feedback information for the downlink shared channel transmission. The operations of 2020 may be performed according to the methods described herein. In some examples, aspects of the operations of 2020 may be performed by a monitoring component as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving an uplink grant that indicates scheduling information for an uplink shared channel transmission for the UE;
   receiving, after receiving the uplink grant, a downlink grant that indicates scheduling information for a downlink shared channel transmission for the UE or a release of periodically scheduled resources for the UE;
   generating feedback information associated with the downlink grant based at least in part on receiving the downlink grant after receiving the uplink grant; and
   performing the uplink shared channel transmission including the feedback information associated with the downlink grant based at least in part on the scheduling information for the uplink shared channel transmission indicated by the uplink grant.

2. The method of claim 1, further comprising:
   receiving a second downlink grant before receiving the uplink grant, the second downlink grant indicating scheduling information for a second downlink shared channel transmission for the UE or a release of periodically scheduled resources for the UE;
   generating a second feedback information based at least in part on the second downlink grant; and
   performing the uplink shared channel transmission including the second feedback information.

3. The method of claim 2, wherein:
   the feedback information comprises hybrid automatic repeat request (HARQ)-acknowledgement (ACK) feedback corresponding to the downlink shared channel transmission or the release of periodically scheduled resources for the UE; and
   the second feedback information for the second downlink shared channel transmission comprises HARQ-ACK feedback corresponding to the second downlink shared channel transmission or the release of periodically scheduled resources for the UE.

4. The method of claim 2, further comprising:
   generating a first codebook associated with the feedback information; and
   generating a second codebook associated with the second feedback, the second codebook separate from the first codebook.

5. The method of claim 4, wherein performing the uplink shared channel transmission comprises:
   mapping a set of feedback bits of the first codebook and the second codebook to a set of resources identified by the scheduling information for the uplink shared channel transmission; and
   mapping information bits of the uplink shared channel transmission around the set of resources.

6. The method of claim 5, wherein mapping the set of feedback bits comprises:
   mapping the set of feedback bits of the first codebook to a first subset of resources; and
   mapping the set of feedback bits of the second codebook to a second subset of resources, wherein the second subset and the first subset are non-overlapping.

7. The method of claim 6, further comprising:
   mapping the set of feedback bits of the first codebook to at least one symbol following a set of symbols associated with a demodulation reference signal, the set of feedback bits of the second codebook, and channel state information feedback.

8. The method of claim 6, further comprising:
   mapping the set of feedback bits of the first codebook to at least one symbol following a set of symbols associated with a corresponding uplink control channel.

9. The method of claim 4, further comprising:
   mapping a set of feedback bits of the second codebook to a set of resources identified by the scheduling information for the uplink shared channel transmission;
   mapping information bits of the uplink shared channel transmission around the set of resources;
   puncturing a subset of the mapped information bits; and
   mapping a set of feedback bits of the first codebook to resources corresponding to the punctured subset of the mapped information bits.

10. The method of claim 9, further comprising:
    puncturing a subset of the mapped set of feedback bits of the second codebook; and
    mapping a second set of feedback bits of the first codebook to the punctured subset of the mapped set of feedback bits of the second codebook.

11. The method of claim 2, further comprising:
    identifying a semi-static codebook configuration associated with a semi-static hybrid automatic repeat request (HARQ)-acknowledgement (ACK) feedback codebook; and
    generating the uplink shared channel transmission based at least in part on the semi-static codebook configuration, wherein the generating comprises including the feedback information in corresponding locations of the semi-static HARQ-ACK codebook.

12. The method of claim 1, further comprising:
generating a channel state information report; and
performing the uplink shared channel transmission including the channel state information report.

13. The method of claim 12, further comprising:
mapping the channel state information report to a set of resources identified by the scheduling information for the uplink shared channel transmission;
rate matching information bits of the uplink shared channel transmission around the set of resources;
puncturing a subset of the rate matched information bits; and
mapping a set of feedback bits of a first codebook associated with the downlink shared channel to resources corresponding to the punctured subset of the rate matched information bits.

14. The method of claim 13, further comprising:
puncturing a subset of the channel state information report; and
mapping a second set of feedback bits of the first codebook resources corresponding to the punctured subset of the channel state information report.

15. The method of claim 1, further comprising:
mapping information bits of the uplink shared channel transmission to a set of resources identified by the scheduling information for the uplink shared channel transmission;
puncturing a subset of the mapped information bits; and
mapping a set of feedback bits corresponding to the feedback information for the downlink shared channel transmission to at least a portion of resources corresponding to the punctured subset of the mapped information bits.

16. The method of claim 1, further comprising:
identifying a transmission power control command for adjusting a transmission power of the uplink shared channel transmission; and
performing the uplink shared channel transmission based at least in part on the transmission power control command.

17. The method of claim 16, wherein identifying the transmission power control command comprises:
receiving an indication of the transmission power control command in the downlink grant, the transmission power control command indicating an adjustment of the transmission power of the uplink shared channel transmission with respect to a previous transmission power control command.

18. The method of claim 17, wherein the previous transmission power control command is indicated by the uplink grant.

19. The method of claim 1, the method further comprising:
including the feedback information in the uplink shared channel transmission based at least in part on at least one of a feedback codebook size, a feedback codebook type, an uplink shared channel transmission duration, a modulation coding scheme, a timeline, a UE capability, or any combination thereof.

20. The method of claim 19, wherein the feedback information is included in the uplink shared channel transmission if the codebook for the feedback information contains one or two information bits.

21. The method of claim 19, wherein the timeline is associated with a processing time for preparing the feedback information or a threshold number of symbols.

22. The method of claim 19, further comprising:
transmitting a report of the UE capability to a base station, the UE capability comprising an indication of the feedback information for the downlink shared channel transmission or a processing time associated with the UE.

23. A method for wireless communications at a base station, comprising:
transmitting an uplink grant that indicates scheduling information for an uplink shared channel transmission for a user equipment (UE);
transmitting, after transmitting the uplink grant, a downlink grant that indicates scheduling information for a downlink shared channel transmission for the UE or a release of periodically scheduled resources for the UE; and
monitoring for the uplink shared channel transmission from the UE based at least in part on the scheduling information for the uplink shared channel transmission indicated by the uplink grant, the uplink shared channel transmission comprising feedback information associated with the downlink grant.

24. The method of claim 23, further comprising:
transmitting a second downlink grant before transmitting the uplink grant, the second downlink grant indicating scheduling information for a second downlink shared channel transmission for the UE;
transmitting the second downlink shared channel transmission based at least in part on the scheduling information for the second downlink shared channel transmission; and
receiving the uplink shared channel transmission from the UE based at least in part on the scheduling information for the uplink shared channel transmission, the uplink shared channel transmission comprising feedback information for the second downlink shared channel transmission.

25. The method of claim 24, wherein:
the feedback information for the downlink shared channel comprises hybrid automatic repeat request (HARQ)-acknowledgement (ACK) feedback corresponding to the downlink shared channel or the release of periodically scheduled resources for the UE; and
the feedback information for the second downlink shared channel comprises HARQ-ACK feedback corresponding to the second downlink shared channel.

26. The method of claim 24, further comprising:
determining feedback information for at least one of the first and second downlink shared channel transmissions, wherein the uplink shared channel transmission comprises a first codebook associated with feedback information for the downlink shared channel transmission and a second codebook associated with feedback information for the second downlink shared channel transmission separate from the first codebook.

27. The method of claim 26, wherein the uplink shared channel transmission comprises a set of feedback bits of the first codebook and the second codebook mapped to a set of resources identified by the scheduling information for the uplink shared channel transmission and a set of information bits mapped around the set of resources.

28. The method of claim 27, wherein a subset of feedback bits of the first codebook is mapped to a first subset of resources non-overlapping with a second subset of resources associated with a mapped subset of feedback bits of the second codebook.

29. An apparatus for wireless communications at a user equipment (UE), comprising: a processor, memory in electronic communication with the processor; and instructions stored in the memory and executable by the processor to cause the apparatus to:
  receive an uplink grant that indicates scheduling information for an uplink shared channel transmission for the UE;
  receive, after receiving the uplink grant, a downlink grant that indicates scheduling information for a downlink shared channel transmission for the UE;
  monitor for the downlink shared channel transmission based at least in part on the scheduling information for the downlink shared channel transmission;
  generate feedback information for the downlink shared channel transmission based at least in part on the monitoring and receiving the downlink grant after receiving the uplink grant; and
  perform the uplink shared channel transmission including the feedback information associated with the downlink shared channel transmission based at least in part on the scheduling information for the uplink shared channel transmission indicated by the uplink grant.

30. An apparatus for wireless communications at a base station, comprising: a processor, memory in electronic communication with the processor; and instructions stored in the memory and executable by the processor to cause the apparatus to:
  transmit an uplink grant that indicates scheduling information for an uplink shared channel transmission for a user equipment (UE);
  transmit, after transmitting the uplink grant, a downlink grant that indicates scheduling information for a downlink shared channel transmission for the UE; and
  monitor for the uplink shared channel transmission from the UE based at least in part on the scheduling information for the uplink shared channel transmission indicated by the uplink grant, the uplink shared channel transmission comprising feedback information for the downlink shared channel transmission.

* * * * *